United States Patent
Hosseini et al.

(10) Patent No.: US 11,422,431 B2
(45) Date of Patent: Aug. 23, 2022

(54) OPTICAL SWITCHING USING SPATIALLY DISTRIBUTED PHASE SHIFTERS

(71) Applicant: Analog Photonics LLC, Boston, MA (US)

(72) Inventors: Ehsan Shah Hosseini, Boston, MA (US); Michael Robert Watts, Hingham, MA (US); Matthew Byrd, Arlington, MA (US)

(73) Assignee: Analog Photonics LLC, Boston, MA (US)

( * ) Notice: Subject to any disclaimer, the term of this patent is extended or adjusted under 35 U.S.C. 154(b) by 189 days.

(21) Appl. No.: 16/899,036

(22) Filed: Jun. 11, 2020

(65) Prior Publication Data

US 2020/0393737 A1    Dec. 17, 2020

Related U.S. Application Data

(60) Provisional application No. 62/862,209, filed on Jun. 17, 2019.

(51) Int. Cl.
  *G02F 1/313* (2006.01)
  *G02F 1/225* (2006.01)

(52) U.S. Cl.
  CPC .............. *G02F 1/313* (2013.01); *G02F 1/225* (2013.01); *G02F 2203/50* (2013.01)

(58) Field of Classification Search
  CPC .......... G02F 1/313; G02F 1/225; G02F 1/292; G02F 2203/50
  USPC ......................................... 385/16, 17, 20–23
  See application file for complete search history.

(56) References Cited

U.S. PATENT DOCUMENTS

| | | | |
|---|---|---|---|
| 6,097,859 A | 8/2000 | Solgaard et al. | |
| 6,259,833 B1 | 7/2001 | Doerr et al. | |
| 6,259,834 B1 | 7/2001 | Shani | |
| 6,760,504 B2 | 7/2004 | Duer | |
| 6,819,821 B2 | 11/2004 | Lacey et al. | |
| 6,859,574 B2 * | 2/2005 | Doerr ....................... | G02B 6/32 385/33 |

(Continued)

OTHER PUBLICATIONS

Seok et al., "Silicon photonic wavelength cross-connect with integrated MEMS switching", APL Photonics 4, 100803, 2019.

(Continued)

*Primary Examiner* — Robert Tavlykaev
(74) *Attorney, Agent, or Firm* — Young Basile Hanlon & MacFarlane, P.C.

(57) ABSTRACT

An optical switching apparatus comprises: input ports receiving respective input optical waves, each coupled to a respective beam-forming structure comprising: an input optical waveguide, an optical power distributor to distribute optical power from a mode of the optical waveguide over the respective spatial region, and a spatially distributed phase shifter to apply different transmission optical phase shifts over different portions of the respective spatial region, where the transmission optical phase shifts determine the selected transmission angle; and output ports providing respective output optical waves, each coupled to a respective beam-receiving structure comprising: a spatially distributed phase shifter to apply different reception optical phase shifts over different portions of the respective spatial region, where the reception optical phase shifts determine the selected reception angle, an optical power combiner to combine optical power from different portions of the respective spatial region into a collected a mode, and an output optical waveguide.

30 Claims, 28 Drawing Sheets

(56) References Cited

U.S. PATENT DOCUMENTS

| | | | |
|---|---|---|---|
| 6,934,444 B2 | 8/2005 | Ghiron et al. | |
| 7,088,882 B2 * | 8/2006 | Ducellier | G02B 6/12011 385/24 |
| 7,360,705 B2 * | 4/2008 | Heinrich | G06K 7/10574 235/462.43 |
| 7,373,037 B2 | 5/2008 | Wu | |
| 7,546,005 B2 * | 6/2009 | Ishizaka | B82Y 20/00 385/16 |
| 2004/0071390 A1 * | 4/2004 | Horst | G02B 6/122 385/17 |
| 2004/0258351 A1 * | 12/2004 | Ducellier | H04Q 11/0005 385/24 |
| 2017/0315387 A1 * | 11/2017 | Watts | G02F 1/292 |

OTHER PUBLICATIONS

Zheng et al., "Three-dimensional MEMS photonic cross-connect switch design and performance", IEEE Journal of Selected Topics in Quantum Electronics, Apr. 2003.

Yoo et al., "Optical phased array using high contrast gratings for two dimensional beamforming and beamsteering", Optics Express, vol. 21, No. 10, 12238-12248, May 20, 2013.

Yoo et al., "A 32×32 optical phased array using polysilicon sub-wavelength high-contrast-grating mirrors", Optics Express, vol. 22, No. 16, 19029-19039, Aug. 11, 2014.

Cheng et al., "Recent advances in optical technologies for data centers: a review", Optica, vol. 5, No. 11, 1354-1370, Nov. 2018.

Wang et al., "2D broadband beamsteering with large-scale MEMS optical phased array", Optica, vol. 6, No. 5, 557-562, May 2019.

* cited by examiner

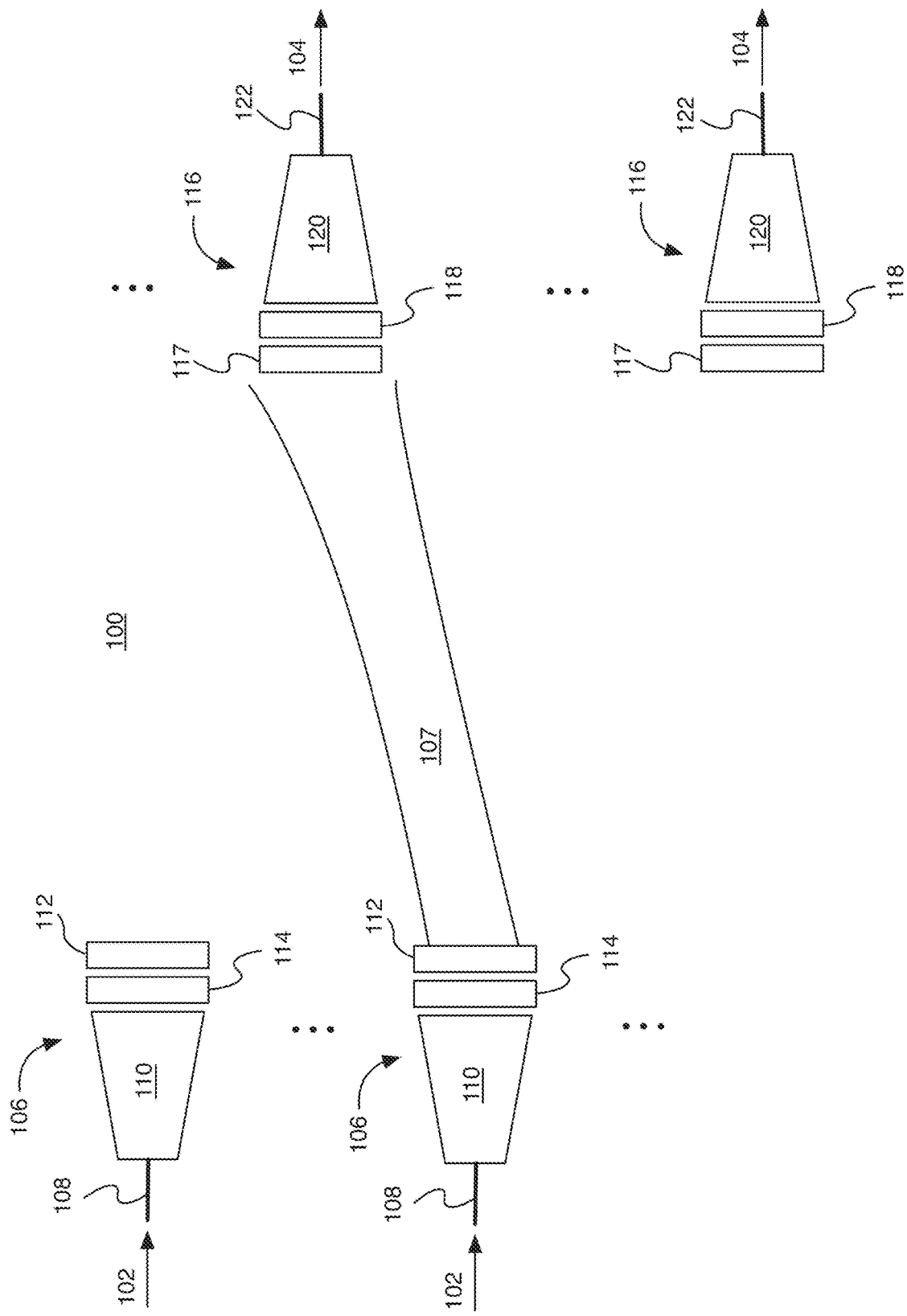

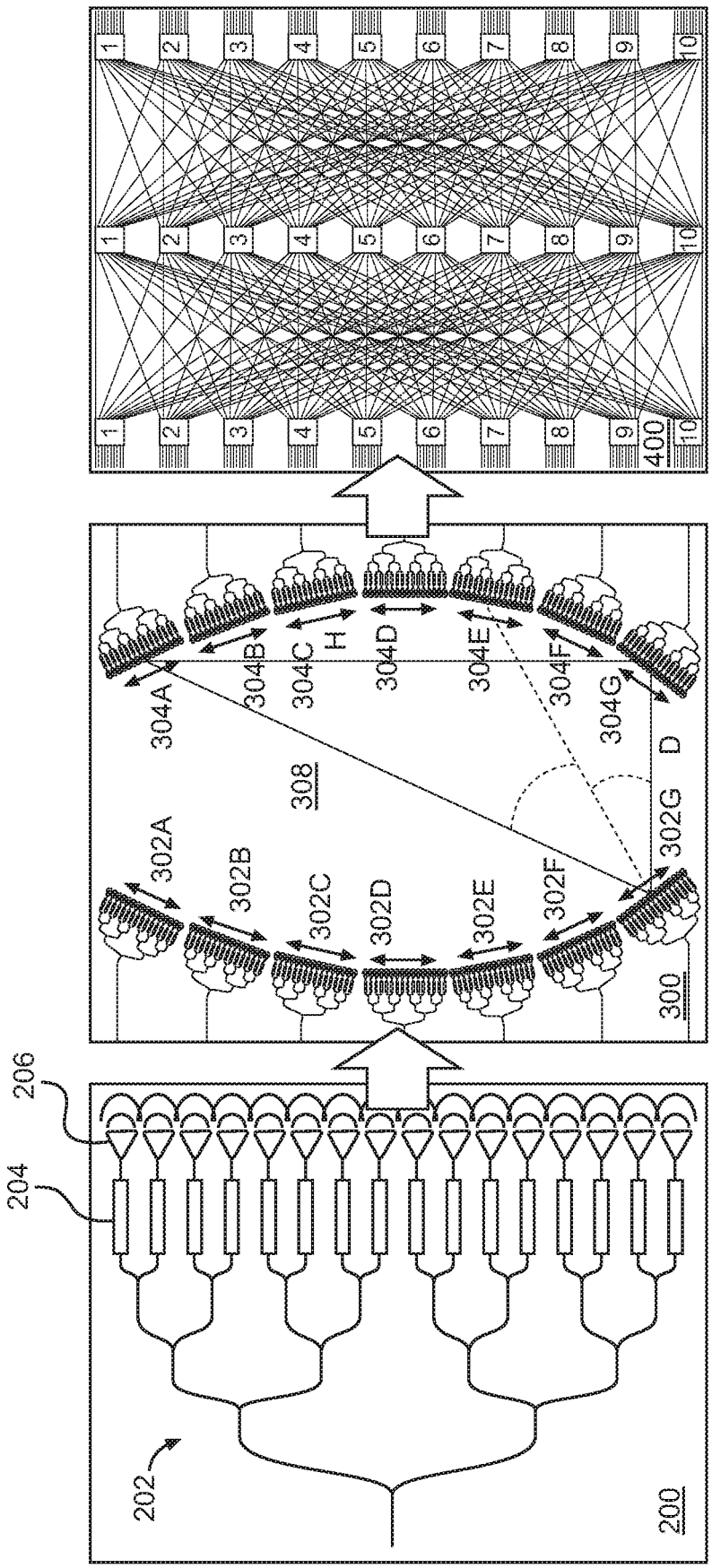

OPTICAL SWITCHING USING SPATIALLY DISTRIBUTED PHASE SHIFTERS

CROSS-REFERENCE TO RELATED APPLICATION(S)

This application claims priority to and the benefit of U.S. Provisional Application Patent Ser. No. 62/862,209, entitled "PHOTONICS LARGE SCALE SWITCH," filed Jun. 17, 2019, the entire disclosure of which is hereby incorporated by reference.

TECHNICAL FIELD

This disclosure relates to optical switching using spatially distributed phase shifters.

BACKGROUND

In data centers and high-performance computation centers it is sometimes important to be able to transfer data between nodes at high speeds. Many nodes can be connected to one switch to enable different pairs of nodes to transfer data to each other. One useful characteristic of a path between a pair of nodes is that the path has low loss. Such a switch is able to provide high throughput paths for bidirectional data transfer between specific nodes.

SUMMARY

In one aspect, in general, an optical switching apparatus comprises: a plurality of input ports receiving respective input optical waves, each input port coupled to a respective beam-forming structure that emits a beam emitted over a respective spatial region at a selected transmission angle, and each beam-forming structure comprising: an optical waveguide into which a respective input optical wave is received, an optical power distributor configured to distribute optical power from a mode of the optical waveguide over the respective spatial region, and a spatially distributed phase shifter configured to apply different transmission optical phase shifts over different portions of the respective spatial region, where the transmission optical phase shifts determine the selected transmission angle; and a plurality of output ports providing respective output optical waves, each output port coupled to a respective beam-receiving structure that collects light from a beam received at a selected reception angle over a respective spatial region, and each beam-receiving structure comprising: a spatially distributed phase shifter configured to apply different reception optical phase shifts over different portions of the respective spatial region, where the reception optical phase shifts determine the selected reception angle, an optical power combiner configured to combine optical power from different portions of the respective spatial region into a collected a mode, and an optical waveguide coupling the collected mode into a respective output optical wave.

Aspects can include one or more of the following features.

A first optical power distributor of a first beam-forming structure comprises a first network of waveguide splitters.

A first optical power combiner of a first beam-receiving structure comprises a second network of waveguide splitters, different from the first network of waveguide splitters.

The first network of waveguide splitters and the second network of waveguide splitters are composed of structures that are identical copies of each other.

The first network of waveguide splitters and the second network of waveguide splitters each include one or more 1×2 splitters.

A first spatially distributed phase shifter of the first beam-forming structure comprises a plurality of individual phase shifters distributed over the respective spatial region associated with the first beam-forming structure.

The first network of waveguide splitters distributes optical power substantially equally to each of the individual phase shifters.

Each of the individual phase shifters is coupled to a respective coupling structure configured to emit optical waves.

A second spatially distributed phase shifter of the first beam-receiving structure comprises a plurality of individual phase shifters distributed over the respective spatial region associated with the first beam-receiving structure.

Each of the individual phase shifters is coupled to a respective coupling structure configured to receive optical waves.

The coupling structures of the first beam-forming structure are distributed adjacent to each other over an aperture at a first edge of an optically transmissive slab, and the coupling structures of the first beam-receiving structure are distributed adjacent to each other over an aperture at a second edge of the optically transmissive slab.

A shape of the first edge is approximately a curved arc, and a shape of the second edge is approximately a curved arc.

The coupling structures of the first beam-forming structure distributed at the first edge and the coupling structures of the first beam-receiving structure distributed adjacent to each other at the second edge are separated by a distance through the optically transmissive slab that is shorter than a Raleigh range associated with a beam formed by the first beam-forming structure that is emitted from the aperture at the first edge.

A first optical power distributor of a first beam-forming structure comprises a first optically transmissive slab.

A first optical power combiner of a first beam-receiving structure comprises a second optically transmissive slab, different from the first optically transmissive slab.

A first spatially distributed phase shifter of the first beam-forming structure comprises a continuous phase-shifting gradient applying phase shifts over the respective spatial region associated with the first beam-forming structure.

The first optically transmissive slab distributes optical power substantially equally over a region of the phase-shifting gradient.

A plurality of identical copies of the optical switching apparatus are included as switching elements within a Clos network arrangement.

The beam-forming structures comprise a first set of optical phased arrays and the beam-receiving structures comprise a second set of optical phased arrays separated from the first set of optical phased arrays by a propagation region over which beams propagate between pairs of optical phased arrays.

The apparatus further includes a third set of optical phased arrays between the first set of optical phased arrays and the second set of optical phased arrays, the third set including at least one optical phased array that receives a beam at a first angle from an optical phased array in the first set and transmits a beam at a second angle different from the first angle to an optical phased array in the second set.

Each spatial region comprises a one-dimensional array of optical coupling structures.

Each spatial region comprises a two-dimensional array of optical coupling structures.

In another aspect, in general, a method of optically switching optical waves received at a plurality of input ports to selected ones of a plurality of output ports comprises: receiving at a plurality of input ports respective input optical waves; emitting a beam from a first optical phased array, coupled to a corresponding one of the input ports, at a selected transmission angle using phase shifts applied to different array elements of the first optical phased array; receiving the beam at a second optical phased array, coupled to a corresponding output port, at a selected reception angle using phase shifts applied to different array elements of the second optical phased array; and providing from a plurality of output ports respective output optical waves corresponding to respective input optical waves, including an output optical wave corresponding to the beam received at the second optical phased array.

In another aspect, in general, a method of fabricating an optical switching apparatus comprises: fabricating set of beam-forming structures coupled to a plurality of input ports receiving respective input optical waves, each input port coupled to a respective beam-forming structure that emits a beam emitted over a respective spatial region at a selected transmission angle, and each beam-forming structure comprising: an optical waveguide into which a respective input optical wave is received, an optical power distributor configured to distribute optical power from a mode of the optical waveguide over the respective spatial region, and a spatially distributed phase shifter configured to apply different transmission optical phase shifts over different portions of the respective spatial region, where the transmission optical phase shifts determine the selected transmission angle; and fabricating a set of beam-receiving structures coupled to a plurality of output ports providing respective output optical waves, each output port coupled to a respective beam-receiving structure that collects light from a beam received at a selected reception angle over a respective spatial region, and each beam-receiving structure comprising: a spatially distributed phase shifter configured to apply different reception optical phase shifts over different portions of the respective spatial region, where the reception optical phase shifts determine the selected reception angle, an optical power combiner configured to combine optical power from different portions of the respective spatial region into a collected mode, and an optical waveguide coupling the collected mode into a respective output optical wave.

Aspects can have one or more of the following advantages.

Efficient techniques for switching optically encoded data streams (e.g., data encoded on optical signals using amplitude and/or phase of one or more optical waves) is described herein. Optical waves are electromagnetic waves that have a spectrum with a peak wavelength that falls in a particular range of optical wavelengths (e.g., between about 100 nm to about 1 mm, or some subrange thereof), also referred to as light waves, or simply light. Using the techniques described herein, an optical switching network can be configured to have low loss and does not require a large amount of power to operate.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a schematic diagram of an example optical switching network that uses spatially distributed phase shifters.

FIG. 2 is a schematic diagram of an example of optical phased array with a power dividing tree and phase shifters and emitters.

FIG. 3 is a schematic diagram of an example of an optical switching network.

FIG. 4 is a schematic diagram of an example of a passive Clos network.

FIGS. 21A and 21B 2D are schematic diagrams of optical phased array configurations.

DETAILED DESCRIPTION

Figure 6:
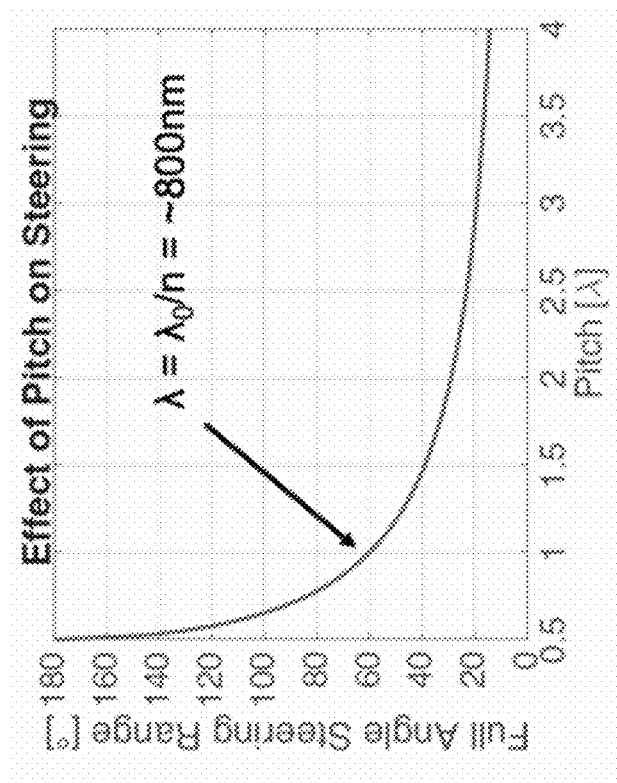
FIG. 6 is a plot of full steering range as a function of grating pitch.

An optical switching network can be used in any of a variety of environments. For example, in a data center signals can be converted between electrical and optical form using lasers or other optical sources, optical modulators, and photodetectors at the appropriate locations for electrical-to-optical conversion and/or optical-to-electrical conversion. In that environment, computing devices that send and receive electrical signals can communicate using optical signals that are transported over optical fiber and switched using the optical switching network, for example. In some implementations, an optical switching network is packaged within an optical switching device that includes optical fiber couplers on input and output ports of the device. Alternatively, an optical switching network can be implemented on a photonic integrated circuit (PIC) that uses waveguides terminated at edges of the PIC or at grating couplers at surfaces of the PIC, for example. FIG. 1 shows an example optical switching network 100 that includes a set of input ports 102 and a set of output ports 104. The input ports 102 receive respective input optical waves, each input port coupled to a respective beam-forming structure 106 that emits a beam 107 emitted over a respective spatial region 112 (e.g., an emitting aperture containing an array of emitters) at a selected transmission angle. Each beam-forming structure 106 includes: an optical waveguide 108 into which a respective input optical wave is received, an optical power distributor 110 configured to distribute optical power from a mode of the optical waveguide over the respective spatial region 112, and a spatially distributed phase shifter 114 configured to apply different transmission optical phase shifts over different portions of the respective spatial region 112. The transmission optical phase shifts determine the selected transmission angle. The output ports 104 provide respective output optical waves. Each output port 104 is coupled to a respective beam-receiving structure 116 that collects light from a beam received at a selected reception angle over a respective spatial region 117 (e.g., a receiving aperture containing an array of receivers). Each beam-receiving structure 116 includes a spatially distributed phase shifter 118, an optical power combiner 120, and an optical waveguide 122. The distributed phase shifter 118 is configured to apply different reception optical phase shifts over different portions of the respective spatial region 117. The reception optical phase shifts determine the selected reception angle. The optical power combiner 120 is configured to combine optical power from different portions of the respective spatial region into a collected a mode. The optical waveguide 122 couples the collected mode into a respective output optical wave provided from one of the output ports 104.

The spatial region over which the beam-forming structure emits a beam, and the spatial region over which the beam-receiving structure receives a beam can be implemented in the form of an optical phased array (OPA). OPAs have proven to be a useful tool for transmitting and receiving light with diffraction limited beams. The same OPA structure can be used for either emitting a beam that is being transmitted outward in a particular direction or receiving a beam (or a portion of a beam) that has been transmitted from a particular direction. So, the following examples of types of OPA structures described in terms of their emission and beam steering characteristics can also be used for receiving. An optical phased array can be formed by dividing the optical power of an optical wave encoded with an optical signal to be transmitted among many emitting elements, also called "emitters," (such as gratings, end fire waveguide emitters, nano antenna metallic emitters, or other coupling structures configured to emit/receive optical waves between from/into waveguides). A collection of phase control elements (such as thermooptic, electrooptic pn junction, Kerr effect phase shifters or liquid crystals, electrooptic crystals or phase changing materials) modulating respective portions of the divided optical power can be dynamically controlled to steer the resulting beam that is formed by constructive interference of the different emitted optical fields. The power division that is used to distribute the optical power to the different phase control elements and emitting elements can be performed by light propagation in an optically transmissive slab (e.g., a thin film slab), or by splitting over a division tree, for example. In a thin film slab, one dimension of a transverse spatial mode emitted from the end of a waveguide starts to spread over a large dimension of the slab, while the other dimension of the transverse spatial mode is confined in a small dimension of the slab. A continuously changing phase shift can then be applied over the large dimension, along the edge of the slab, as the beam emerges from the slab. In such an example, the continuous gradient of emitting elements correspond to neighboring segments of the edge of the slab to which different phase shifts have been applied by a continuous phase-shifting gradient. In other examples, the emitting elements are separated from each other by finite distance, after being fed by different waveguides, such as in a division tree. An example of using a division tree in an optical phased array using multiple individual phase shifters as phase control elements is described in more detail in the following example.

FIG. 2 shows an example of an optical phased array 200 that includes a power division tree 202, phase shifters 204, and emitters 206. In this example, with 1×2 splitters having an even power splitting ratio at each branch of the power division tree 202, the power of an incoming optical wave is divided equally between all of the emitters 206, and the phase shifters 204 are utilized to steer the emitted beam. If all of the emitters 206 are in phase, i.e. all phase shifters 204 are applying the same phase shift (i.e., a zero relative phase shift from one emitter to the next), the beam is emitted straight. When every other phase shifter is applying $\pi$ phase shift relative to its neighboring phase shifters, the array reaches its maximum steering angle for the emitted beam. The spatial distance between neighboring emitters 206 within a grating structure determines whether there will be grating sidelobes and spacing between a main lobe and the sidelobes, as described in more detail below.

Referring to FIG. 3, in some implementations, such optical phased arrays are arranged within an optical switching network 300 to arbitrarily cross-connect input signals received at any of a set of n input ports (7 input ports in this example) to any of a set of n output ports (7 output ports in this example). In this example, a set of the optical phased arrays is used as input port emitting apertures 302A-302G arranged along on a curved arc, where phase shifts are used to steer a beam in a particular direction to a selected one of as set of identical optical phased arrays used as output port collecting apertures 304A-304G arranged along another curved arc, where phase shifts are used to collect some portion of the power a beam arriving in a particular direction. The emitting and collecting apertures can be oriented in a manner that reduces the maximum steering range each aperture has to provide. In this example, the apertures are arranged along concave arc-shaped spatial regions that face each other, as shown in FIG. 3, along opposite edges of an optically transmissive slab propagation region 308 (e.g., a dielectric film) between the curved sets of apertures in which optical waves are able to propagate with relatively low loss. The maximum steering range needed in this configuration is determined as twice the maximum steering angle is determined by the height of the whole switch (H) and the distance (D) between particular apertures across the slab propagation region 308 as described in more detail below (with reference to FIGS. 16A-16C).

To expand the number of available input ports and output ports in an optical switching network, the optical switching network 300 described above can be used as a "switching element" and a collection of such switching elements can be combined in a multi-stage network arrangement (e.g., a Clos network arrangement, or other network arrangement). For example, referring to FIG. 4, in a 3-stage Clos network 400 formed from identical switching elements, if the number of input ports and output ports (I/Os) for each individual switching element is n (10 in this example) and the total number of network I/Os is N (100 in this example), the N/n ratio determines the number of individual switches used (10 in this example). But, in a photonic integrated circuit that uses waveguides to couple the switching elements, as the number of interconnected switching elements increases, so does the number of potentially lossy waveguide crossings. Therefore, to reduce waveguide crossing losses, it is helpful for the number of apertures used in each individual switching element, and thus the number of I/Os n, to be increased.

Figure 5:
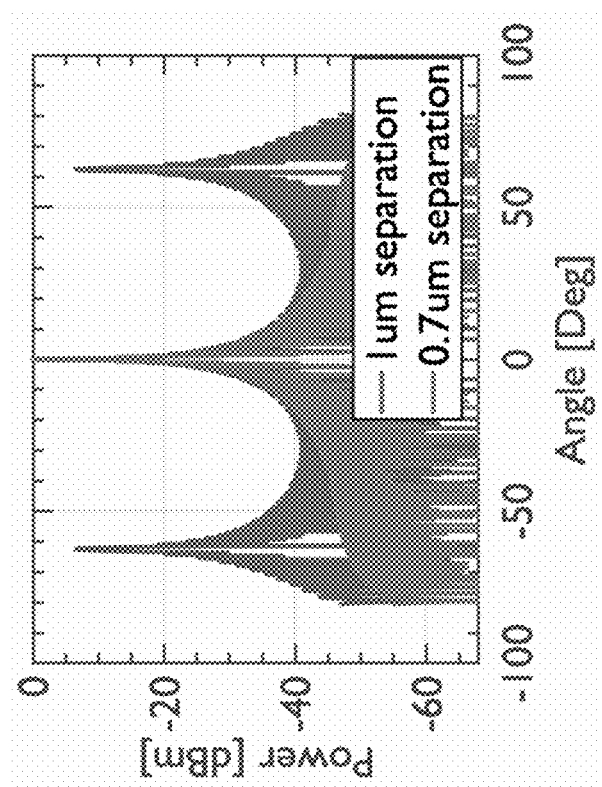
FIG. 5 is a plot of power as a function of angle for different emitter separation.

Potential obstacles in increasing the size of an individual switching element (or simply "switch") are: (1) the steering range a phased array can provide, and (2) the size of the reticle used to fabricate the switch on a photonic integrated circuit platform (such as a silicon photonic platform). FIG. 5 shows a plot of power as a function of angle that illustrates how smaller separation between the emitting elements within an aperture is able to eliminate grating sidelobes. As can be seen in FIG. 5, the existence of the grating sidelobes, and thus the steering range, depends on how close the emitting elements are placed to each other and the refractive index of the dielectric film in which the beam propagates. For example, if the light emitted from the phase shifter and emitter pair at the ends of the waveguides in the power division tree propagates in a dielectric film with an effective index of n=1.5 and the wavelength of the light is 1.3 μm, there is no sidelobes for straight emission with 700 nm distance between adjacent emitters, but sidelobes show up if there is a 1 μm distance between adjacent emitters.

Figure 7:
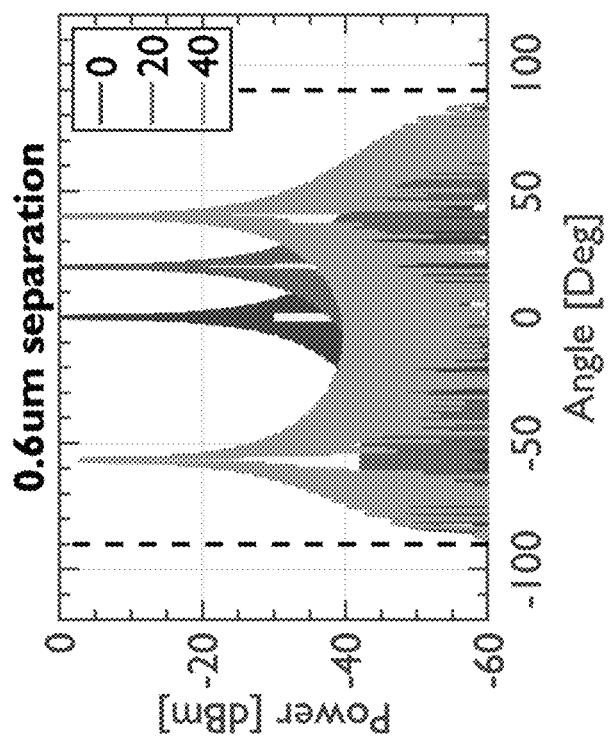
FIG. 7 is a plot of power as a function of angle for different main lobe steering angles.

FIG. 6 is a plot of full angle steering range as a function of grating pitch. As can be seen in FIG. 6, the total steering range before a sidelobe appears depends on the distance between adjacent emitters (also called the "pitch" of the grating of emitters). If the emitters are placed closer than half a wavelength (i.e., P<$\lambda_o$/2n where $\lambda_o$ is the wavelength of light in vacuum, n is the effective index of the dielectric film structure, and P is the pitch, or distance between adjacent emitters) there are no sidelobes (also called a single-lobe grating mode, or single mode emission) even if the optical phased array is steered the maximum possible ±90° (or) 180° steering range. On the other hand, when the spacing between the emitters is increased (e.g., due to fabrication limitations or concerns, or to reduce cross-coupling between waveguides), the single mode emission range is reduced, as shown in FIG. 6. In another example, as can be seen in the power vs. angle plot of FIG. 7, an array with 600 nm spacing between the emitters has a single main lobe within the 180° steering range for 0-degree and 20-degree steering but has a sidelobe showing up for a 40-degree steered main lobe of a beam.

Figure 8:
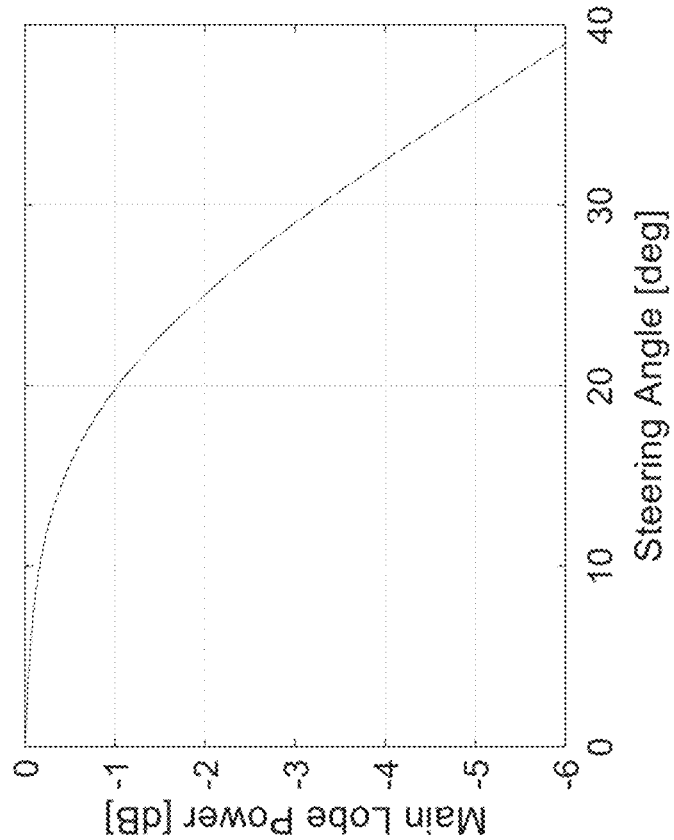
FIG. 8 is a plot of power in the main lobe as a function of steering angle.

When a sidelobe is present in a beam, the amount of power in the main lobe of the beam is not 100%. A percentage of the optical power in a beam is emitted into the sidelobes of that beam, and this shows itself as a loss in the main lobe of the beam. FIG. 8 shows a plot of main lobe power as a function of steering angle as the power lost into a sidelobe increases with increased steering angle. In large arrays, this multi-lobe grating mode can cause both loss in the main lobe and also crosstalk into the other channels corresponding to neighboring apertures that overlap with some of the power in a sidelobe. The amount of power emitted into the main lobe and sidelobes depend on the element factor of the emitters.

Figure 9:
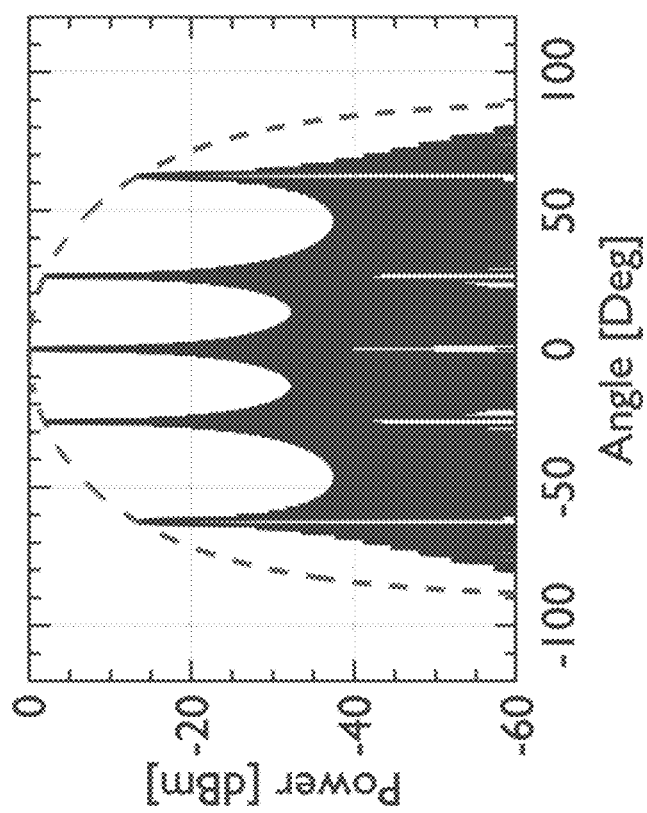
FIG. 9 is a plot of power as a function of angle.

For example, FIG. 9 shows an angular power distribution plot for an example optical phased array. In this example, the angular power distribution has four sidelobes (i.e., 2 pairs of sidelobes on either side of a main lobe). The optical phased array emits an appreciable portion of its power into the first sidelobes, and somewhat less power into the second sidelobes.

Figure 10:
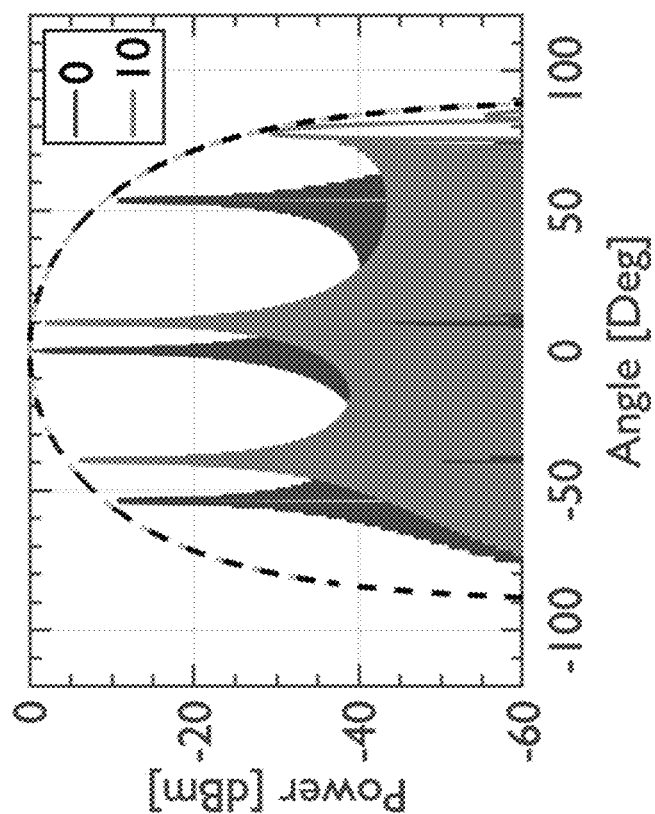
FIG. 10 is a plot of power as a function of angle for different main lobe steering angles.

FIG. 10 shows an angular power distribution plot of another example optical phased array. In this example, there are two sidelobes (i.e., one side lobe on either side of a main lobe). When the main lobe is steered, one of the sidelobes gains more energy and the other sidelobe is suppressed. This effect is illustrated in FIG. 10 for a steering of the main lobe by around 10 degrees.

Figure 11A:
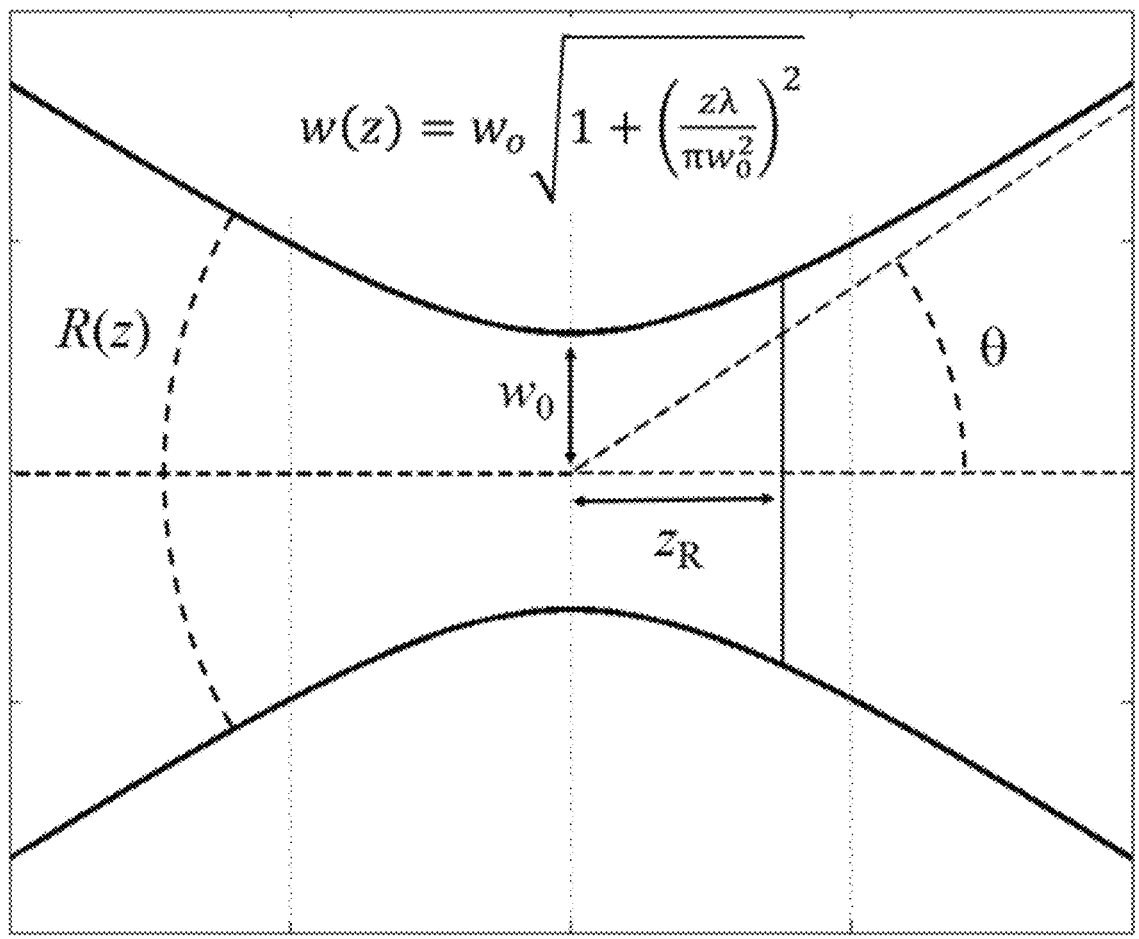
FIGS. 11A and 11B are plots of example beam characteristics.
Figure 11B:
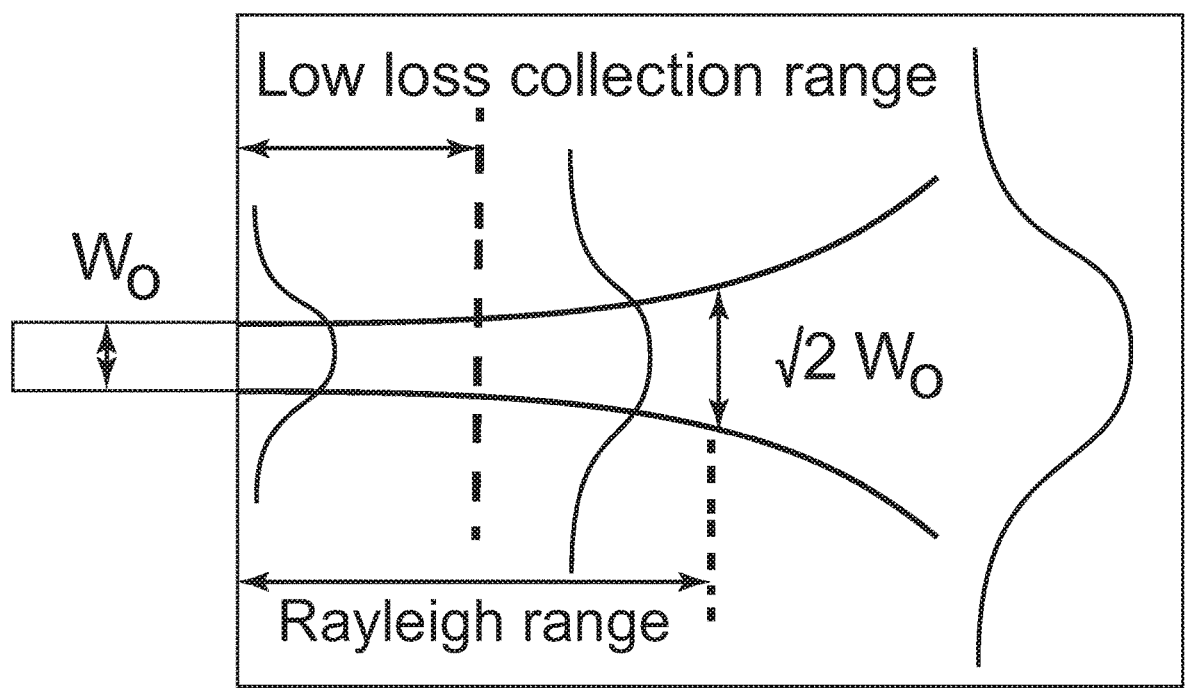

To increase the number of ports at each switching element, a variety of techniques can be used to configure and arrange optical phased arrays within an optical switching network, as shown in FIG. 3 for example, as beam-forming and beam-receiving structures of an n-by-n switch. In other words, each beam-forming optical phased array is used to form a beam that propagates in a predetermined direction in a slab and gradually expands similar to the expansion of a gaussian beam. One (unconfined) dimension of a transverse spatial mode of the beam emitted from an emitting aperture starts to spread over a large dimension (i.e., height) of the slab, while the other (confined) dimension of the transverse spatial mode is confined in a small dimension (i.e., thickness) of the slab. For example, in some implementations, in the small dimension, the slab can be configured to act as a waveguide in that dimension, where the large surfaces of the slab have a lower index cladding on either side (e.g., air, or a lower index material), or other light confining mechanism that prevents the beam spread in that dimension. FIG. 11A, shows an example of beam characteristics in the unconfined dimension modeled as a gaussian beam, which has a minimum transverse intensity profile radius ($w_0$) at its beam waist (z=0) and an expanding radius (w(z)) and decreasing radius of curvature (R(z)) as a phasefront of the beam propagates from the waist. If the beam-receiving optical phased arrays are placed at a distance smaller than the Rayleigh distance (also called Rayleigh range) (z=$z_R$) along the direction of propagation of the gaussian beam, the expansion of the beam will not be significant when received. For example, as shown in FIG. 11B, within a low loss collection range, which in this example is about half the Raleigh range, the width of the beam may be comparable to the width of the aperture of a beam-receiving optical phased array that is about the same as the width of the aperture of the beam-forming optical phase array that formed the beam. The shape of the beams in the confined dimension will also be gaussian, but will generally not spread.

Figure 12A:
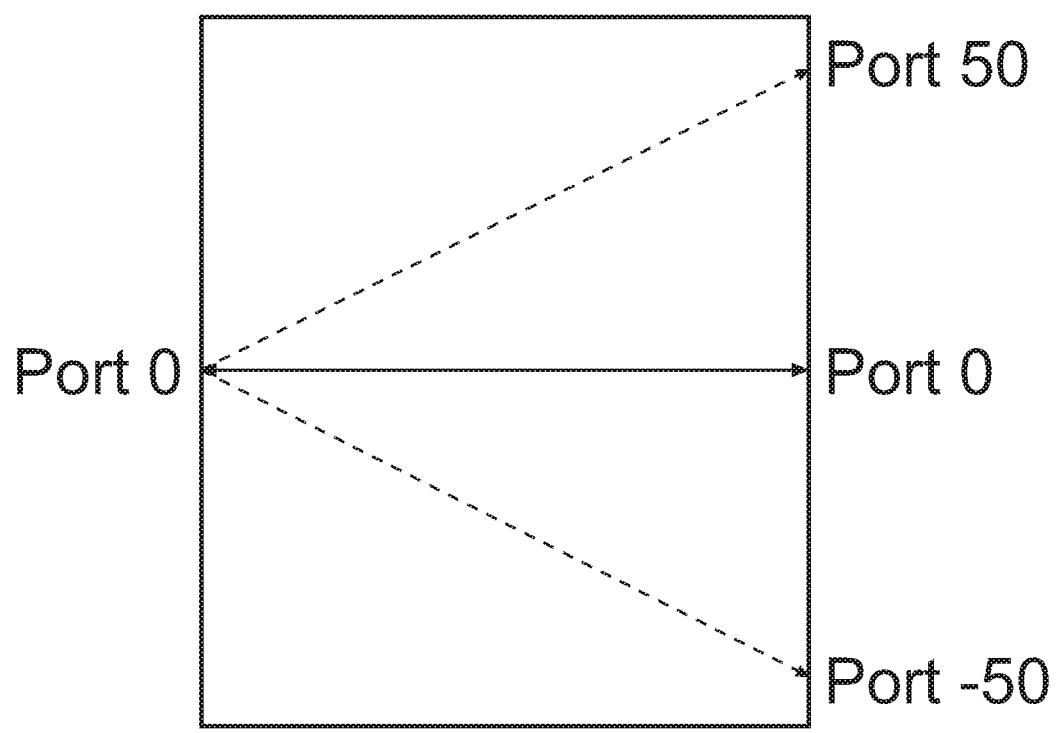
FIG. 12A is a diagram showing a distribution of ports in a switching network, and 12B is a plot of transmission as a function of port number for different angle and length parameters.
Figure 12B:
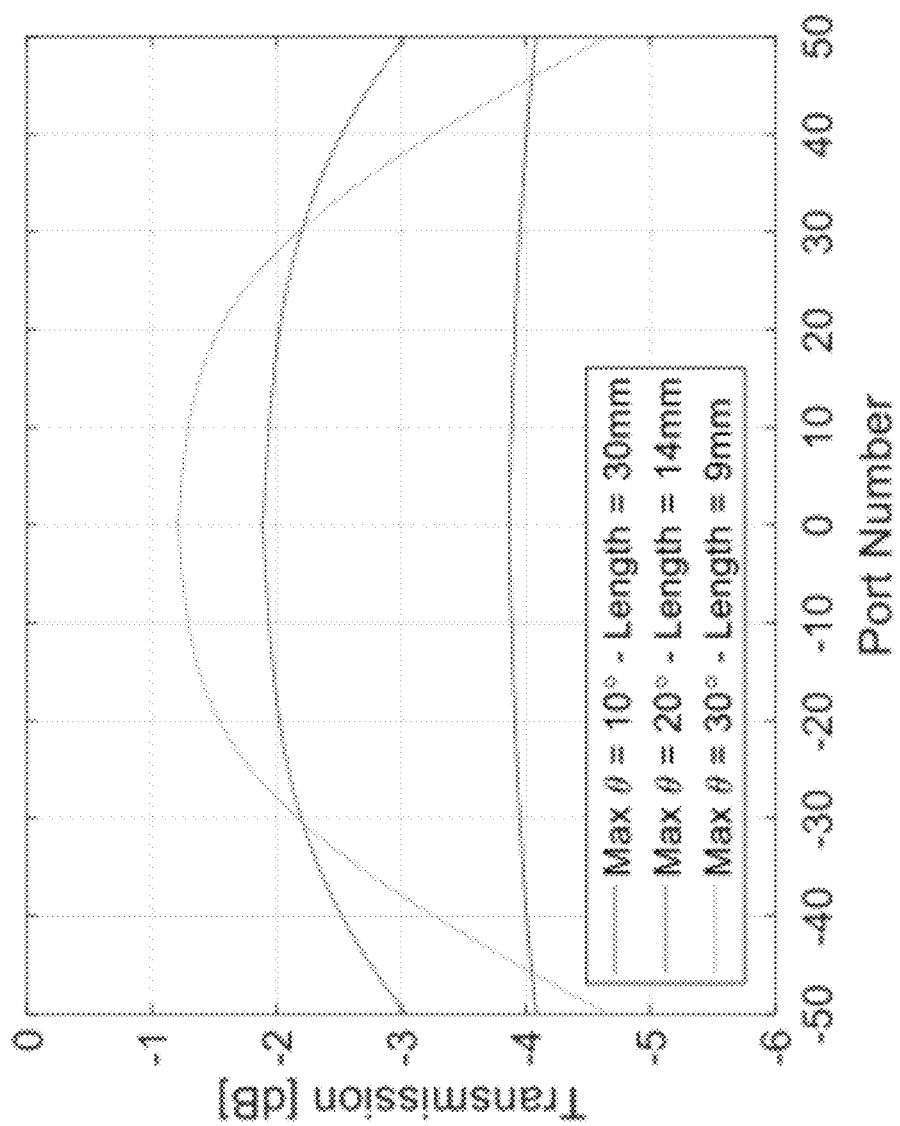

FIG. 12A shows a spatial distribution of ports in a switching network, with output 101 ports numerically labeled from −50 to 50, with port 0 in the middle. FIG. 12B shows plots of transmission loss on a dB scale as a function of port number. For a given number of ports and width of each port, the loss depends on the width of the array.

Figure 13:
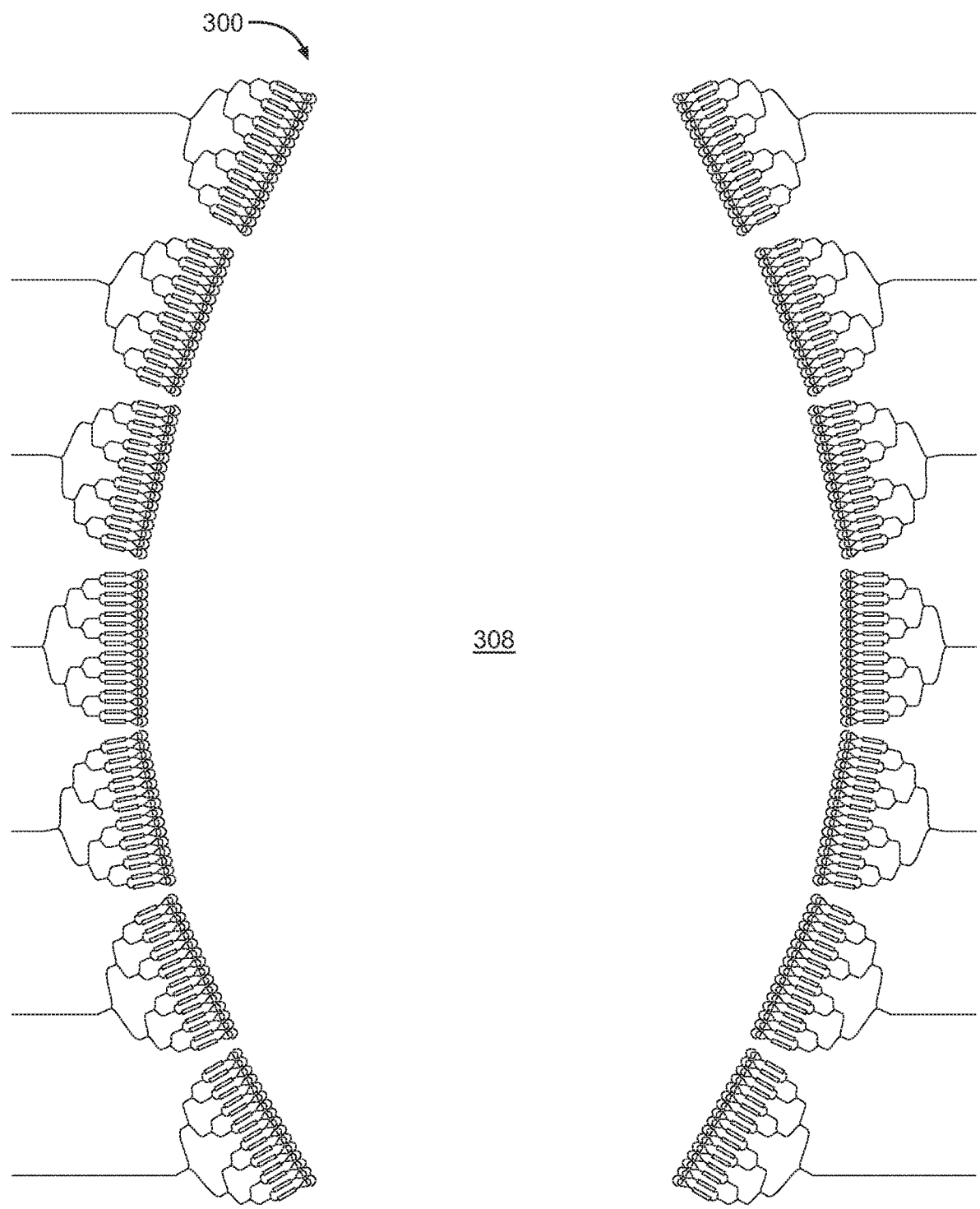
FIG. 13 is a schematic diagram of an optical switching network.
Figure 14:
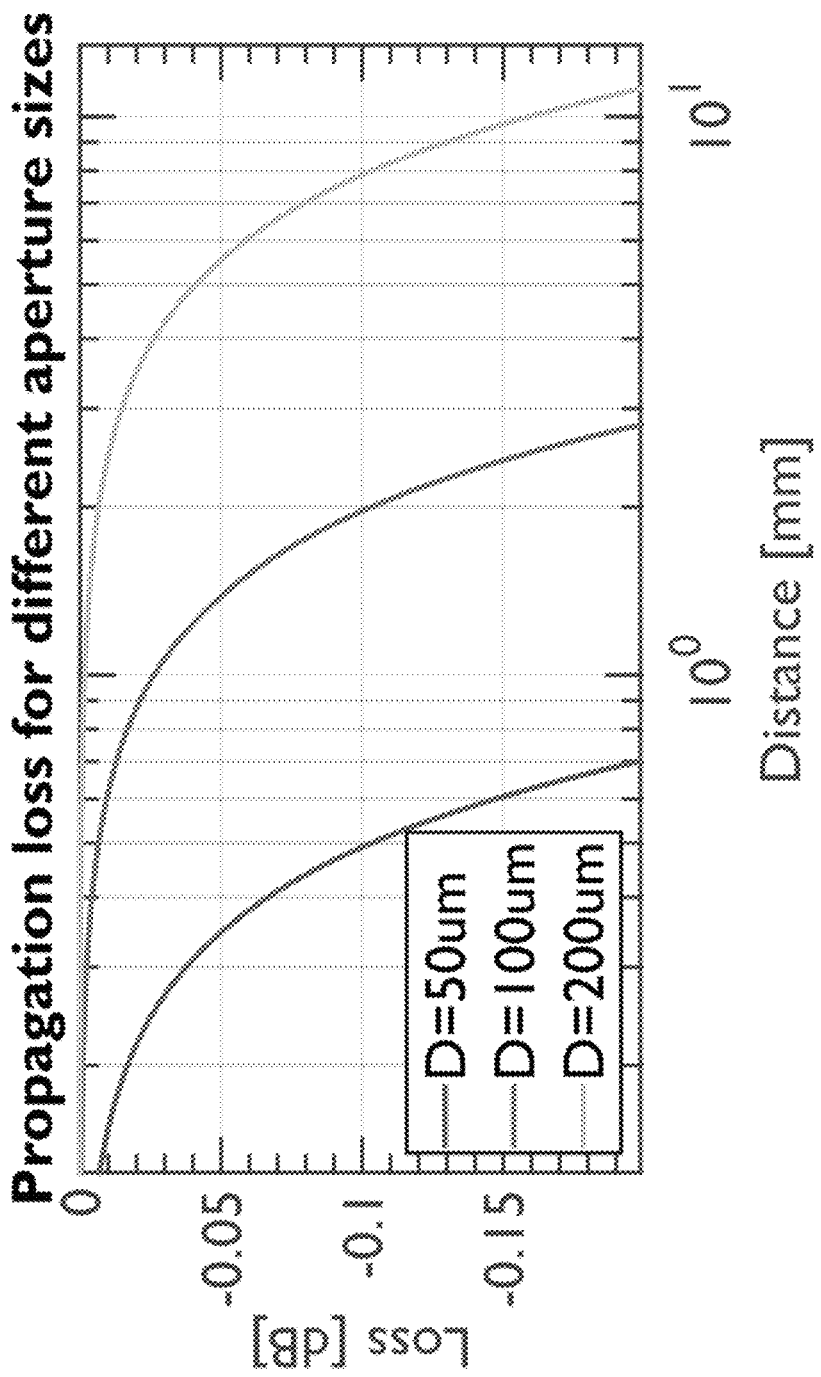
FIG. 14 is a plot of propagation loss as a function of distance for different apertures sizes.

As can be seen in FIG. 13, another view of the optical switching network 300 shows the slab propagation region 308 having a size that is shaped such that distances between pairs of optical phased arrays is relatively short and the maximum angle that each emitting/receiving optical phased array needs to steer/receive the respective light beam is relatively large. On the other hand, depending on the size of the aperture of each optical phased array, the maximum separation between the two sets of optical phased arrays is limited by the loss that a gaussian beam experiences due to diffraction in the medium of the slab propagation region 308. FIG. 14 plots examples of propagation loss experienced between the emitting and collecting apertures as a function of distance for different aperture sizes. Smaller apertures (e.g., 50 µm diameter D) are less tolerant (i.e., experience greater loss) of larger separations between emitting and collection apertures. In this example, the minimum distance between emitting and collection apertures is governed by the optical phased array's steering capability.

Figure 15A:
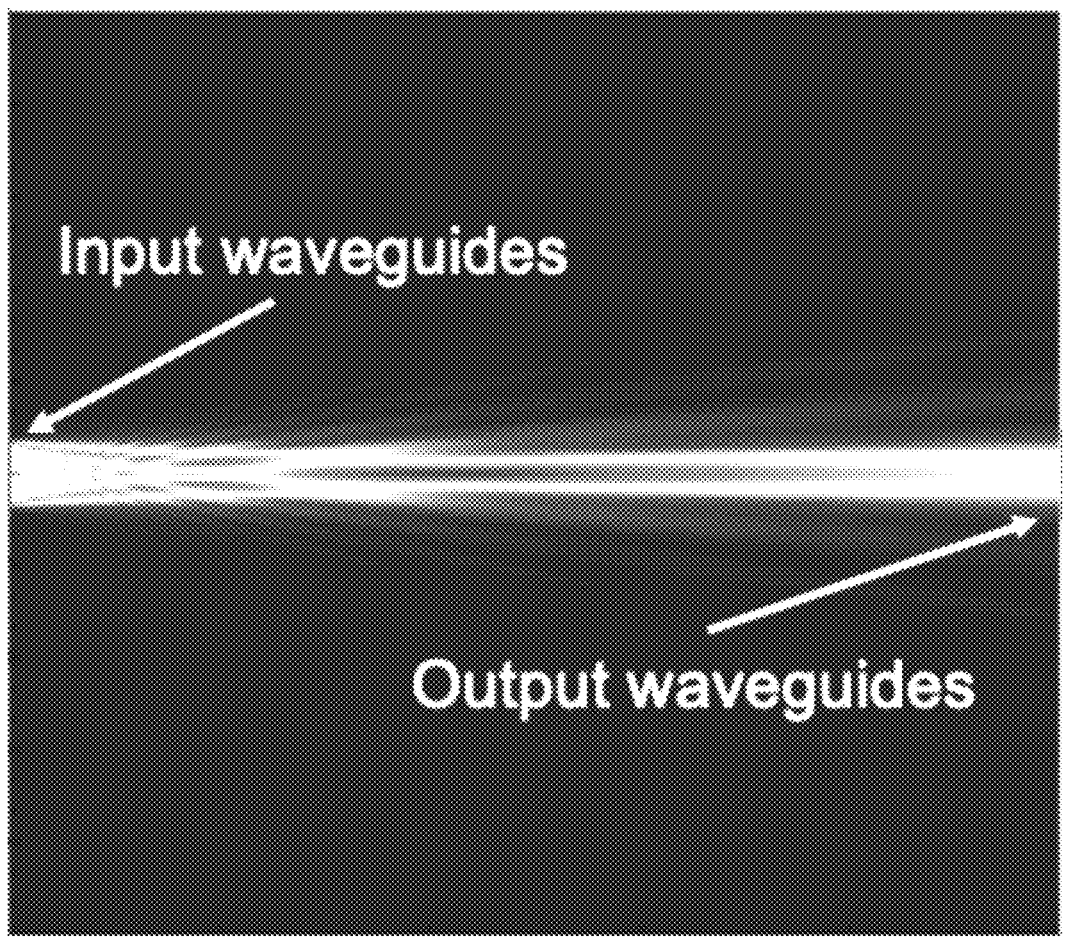
FIGS. 15A and 15B are an image of a FDTD simulation of on-axis transmission loss, and a plot of transmission loss, respectively.
Figure 15B:
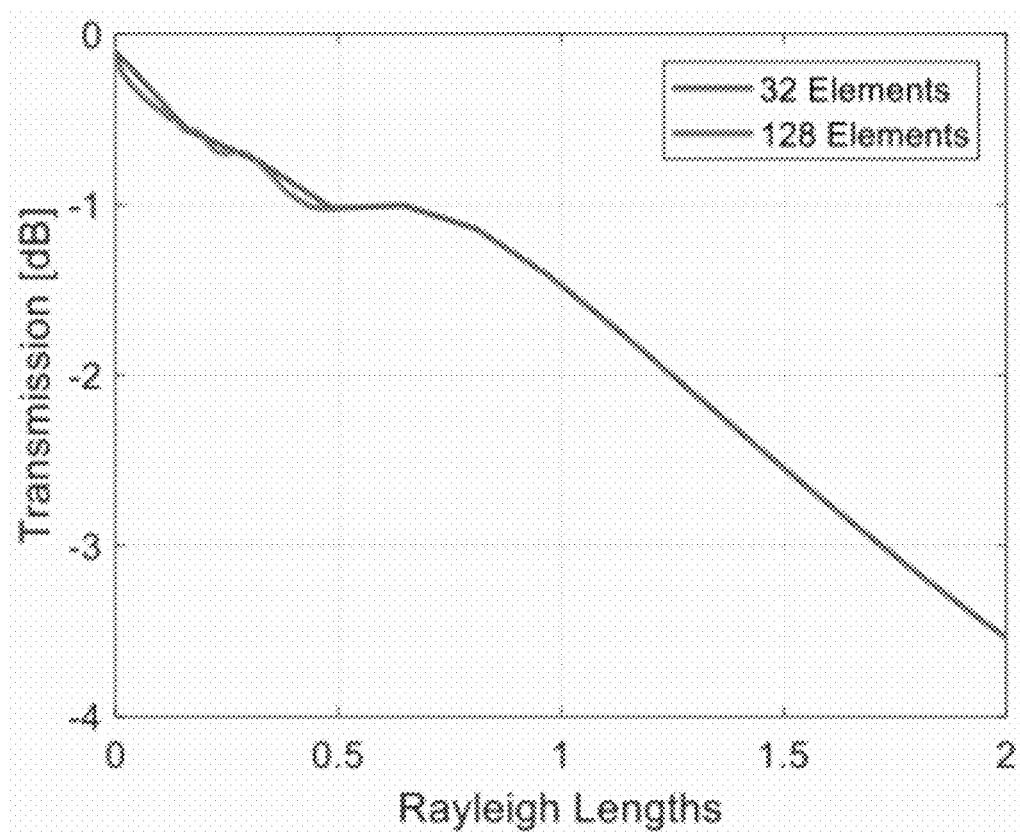

FIG. 15A illustrates an example of low loss propagation by showing a 2D FDTD simulation of a beam emitted from an optical phased array. As can be seen in FIG. 15A, very close to the emitting aperture on the side of the input waveguides, the beam intensity is not shaped smoothly and the beam is still in the near-field range. FIG. 15B shows that to be within 1 dB of propagation loss, the collecting aperture on the side of the output waveguides should be placed closer than about half (i.e., less than a factor of about 0.5 times in the figure) the Rayleigh length. For a 128-element optical phased array, with 700 nm spacing between the emitters, the Rayleigh length is about 10 mm, so the slab should be shorter than about 5 mm.

Figure 16A:
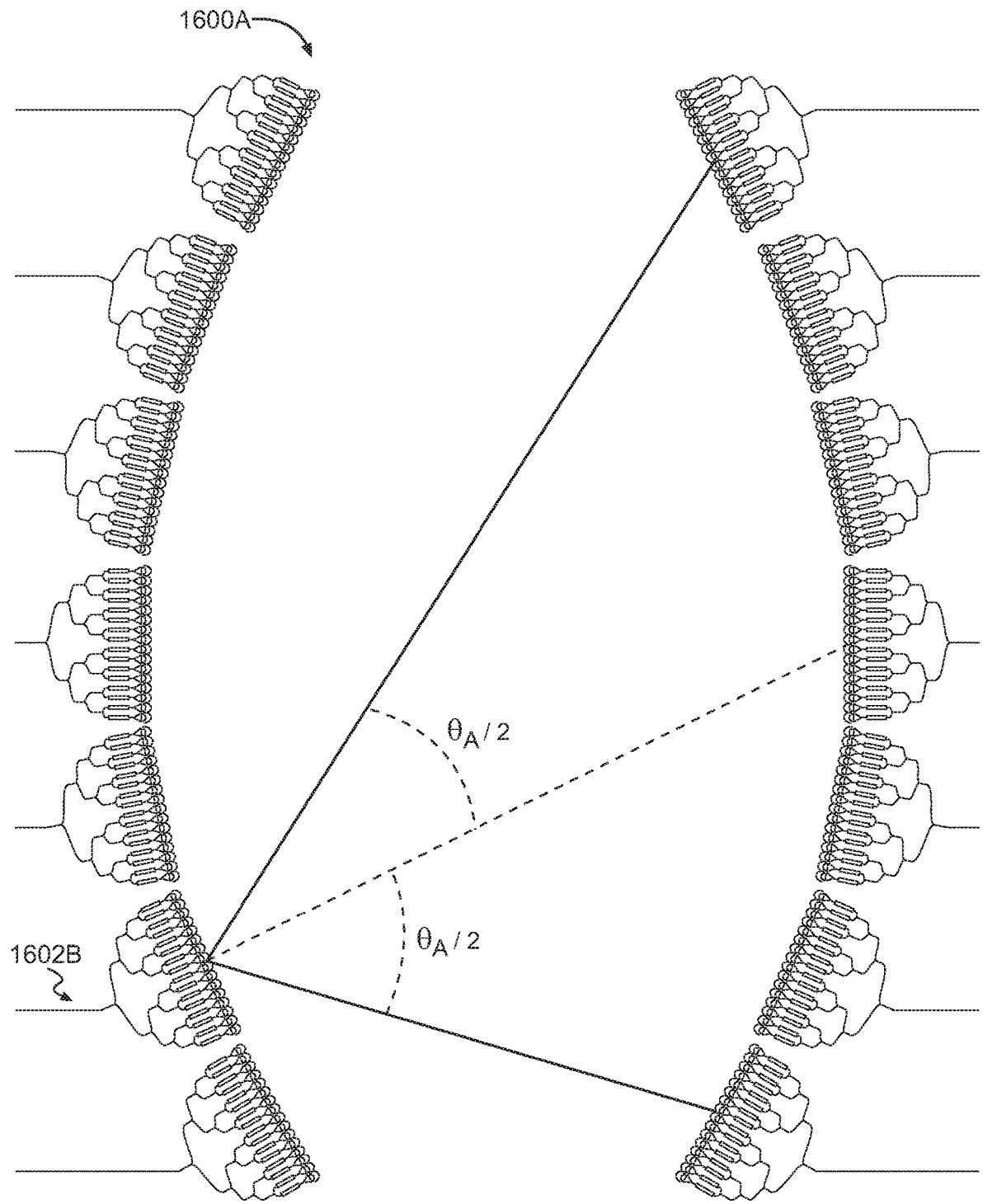
FIGS. 16A and 16B are schematic diagrams of an optical switching network, showing steering ranges for different sizes of slabs.
Figure 16B:
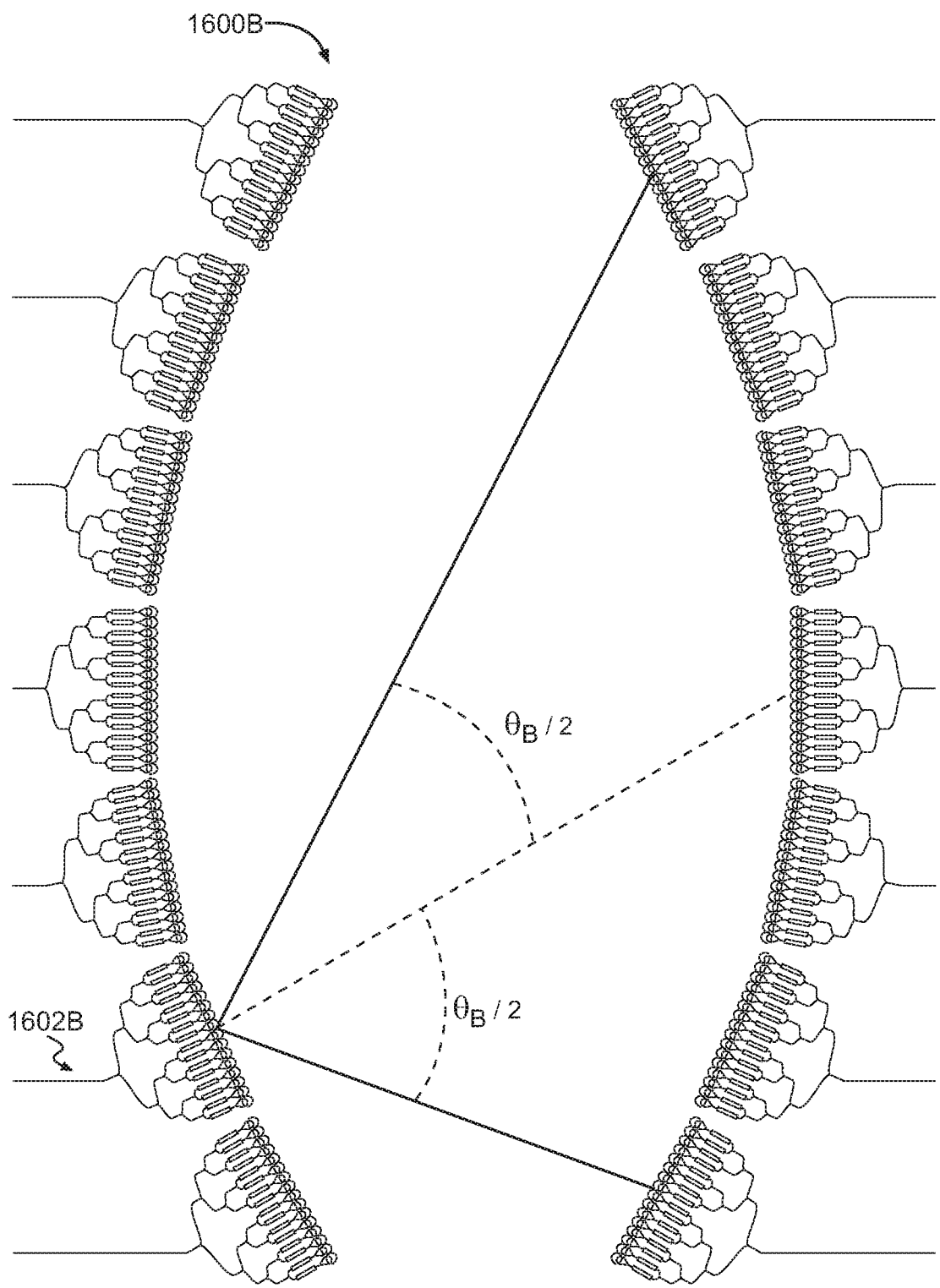
Figure 16C:
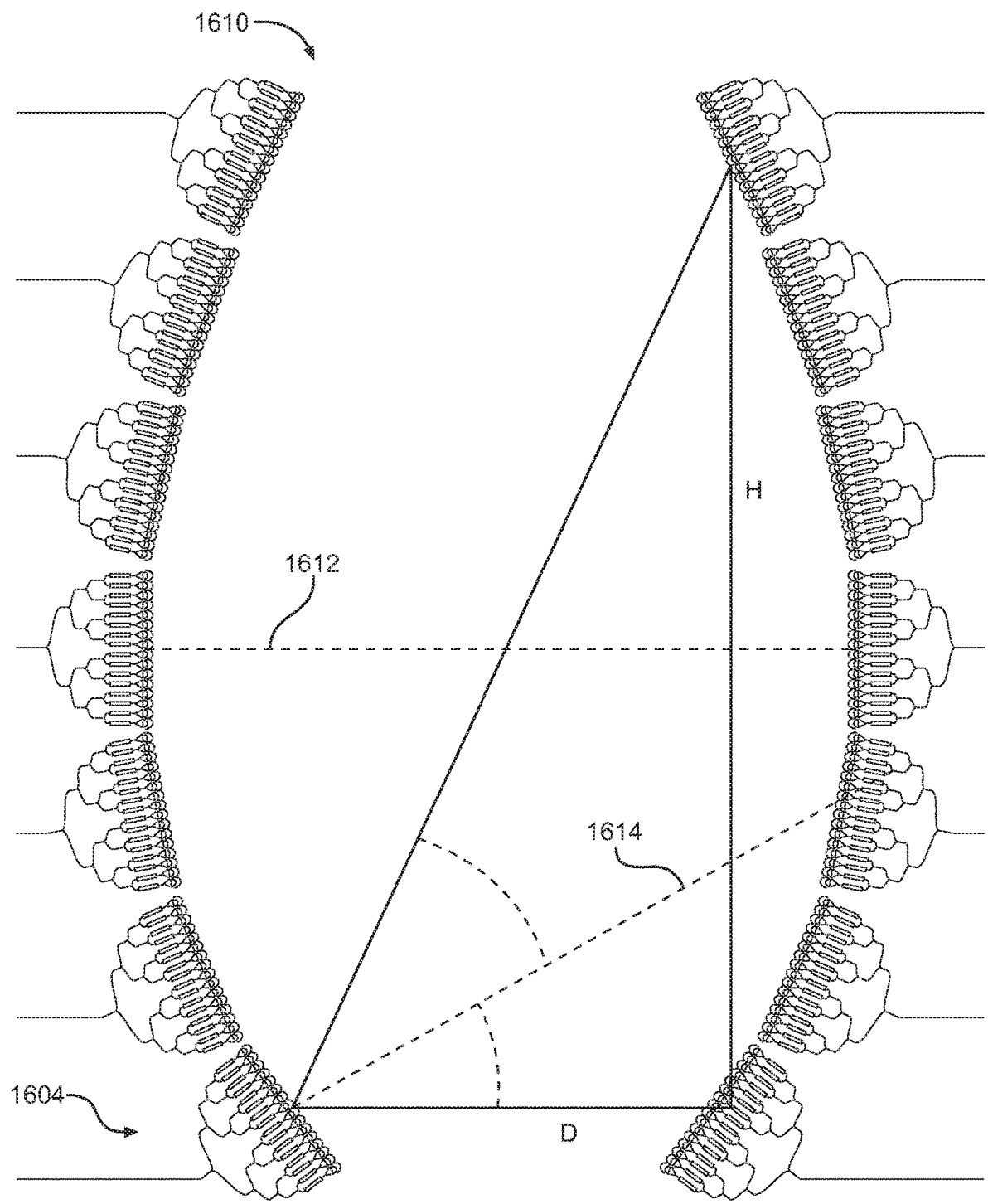
FIG. 16C is a schematic diagram of an optical switching network, showing relationships among steering range and device size.

FIGS. 16A, 16B, and 16C show examples of different optical switching network arrangements with different size slab propagation regions. If the distance between the emitting and collecting apertures of the two sets of optical phased arrays on either side of the slab propagation region is reduced from the larger distance in the arrangement 1600A in FIG. 16A to the smaller distance the arrangement 1600B in FIG. 16B, the maximum angle that a particular optical phased array, 1602A and 1602B, needs to be able to steer is increased from $\theta_A$ for array 1602A to $\theta_B$ for array 1602B. In order to keep the maximum emission and collection angles of the emission and collection apertures small, each aperture can be arranged to face an optimal direction. For example, the emission aperture of the optical phased array 1604 in the arrangement 1610 of FIG. 16C is oriented in an optimal direction.

Figure 17:
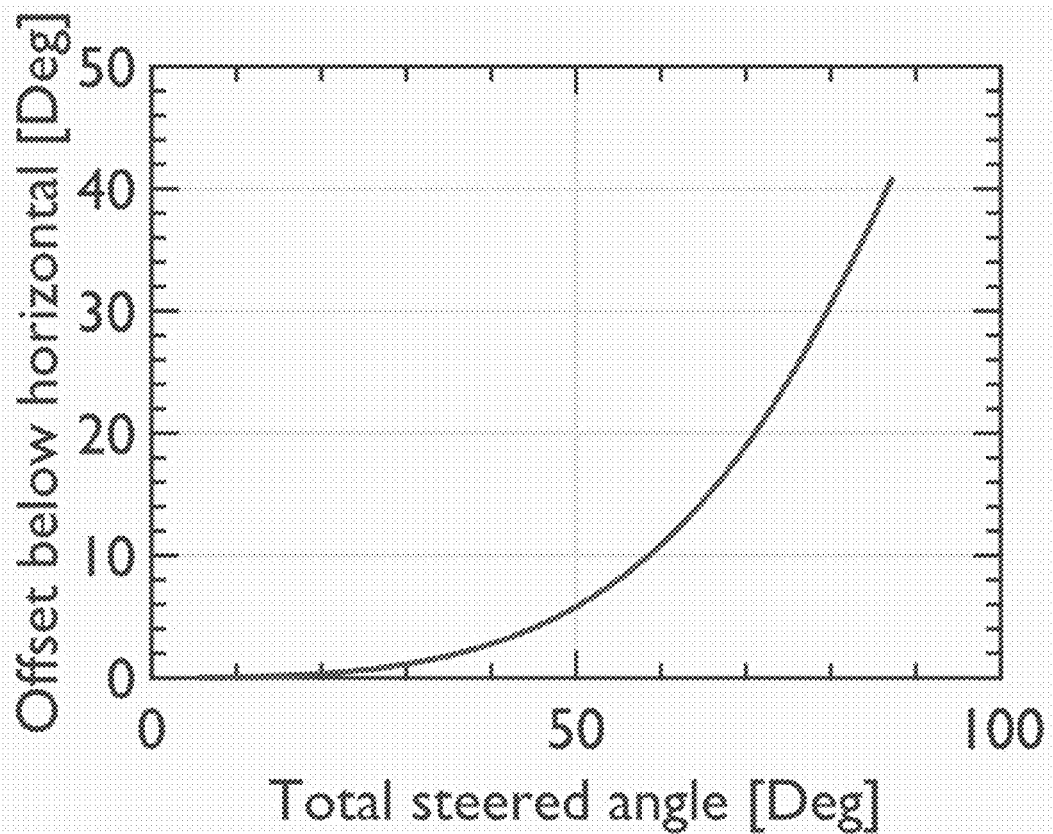
FIG. 17 is a plot of offset below the horizontal center line as a function of total steered angle.

Referring to FIG. 16C, in this example embodiment, the minimum required maximum steering angle for the aperture of the optical phased array 1604 at the bottom of the set of input arrays is achieved when that aperture is facing below the horizontal dashed line 1612. The total steering range of the aperture, regardless of its individual direction, is $\theta=\mathrm{atan}(H/D)$. Therefore, to minimize the maximum steering angle, the normal line 1614 at the center of the optical phased array 1604 should face towards $\theta_1=\mathrm{atan}(H/2D)$, which is smaller than $\theta/2$. When the two arrays are placed far from each other, the maximum steering angle is close to zero and the offset below center (i.e., below the horizontal line 1612) is close to zero too, as shown in the plot of FIG. 17). If the apertures are brought closer, the maximum angle increases and the offset below center is increased too. Therefore, a recursive construction can be used to arrange the apertures, find the optimum angle for each aperture along an arc, and find the maximum height of the optical switching network and necessary steering range for each aperture.

Figure 18B:
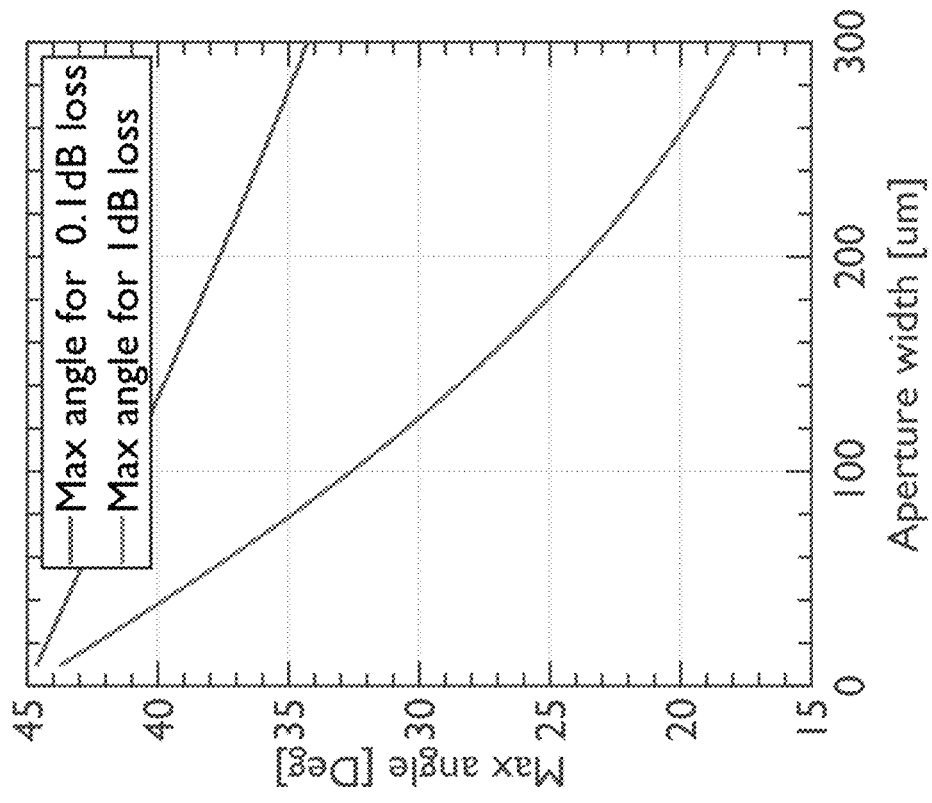
FIGS. 18A and 18B are plots of slab length/width as a function of aperture size, and maximum angle as a function of aperture size, respectively.
Figure 18A:
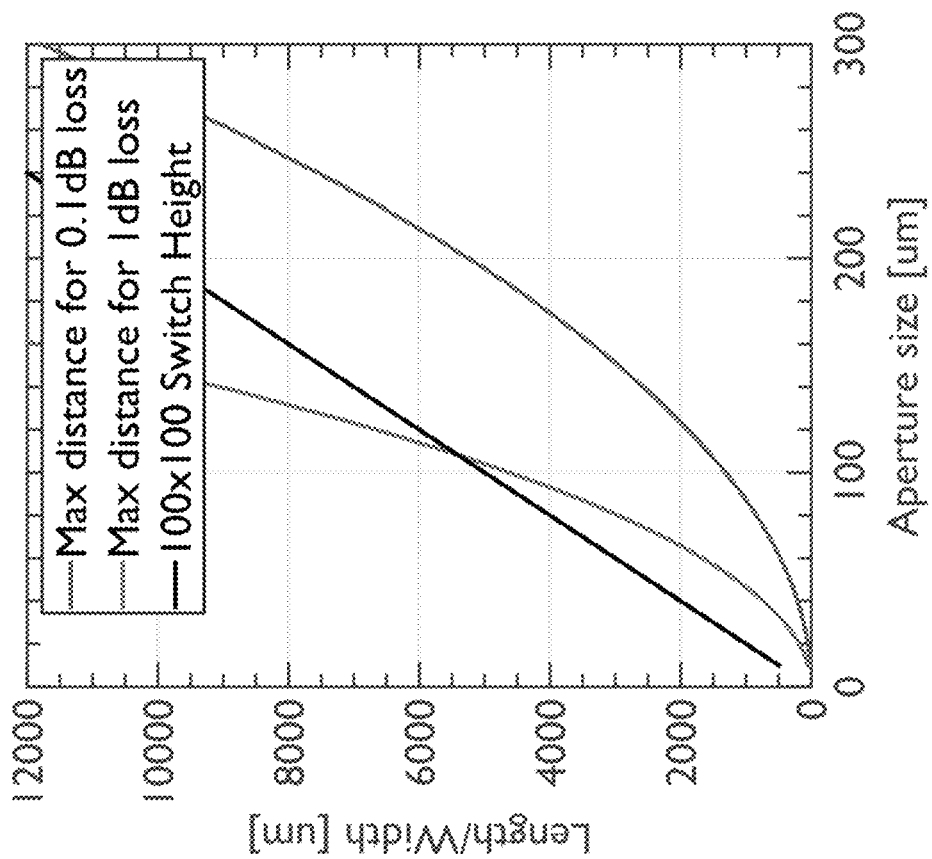

FIG. 18A shows a plot of length/width of the slab as a function of aperture size for different losses, and FIG. 18B shows a plot of maximum angle as a function of aperture size for different losses. The changes in the allowable length of the slab (relative to its width), and the maximum steering angle required are shown as a function of aperture size. For a chosen aperture size, the maximum distance that the light can travel before the gaussian-like beam starts spreading out such that the light is not collected efficiently scales up with the Rayleigh distance, which scales with the beam radius squared ($w_o^2$). On the other hand, the height of the arrangement of optical phased arrays scales with width ($w_o$). Therefore, if the fabrication technology and control circuitry allow, the maximum steering angle improves for a given loss tolerance, and a given element separation, as the number of emitting elements in each array is increased.

Figure 19A:
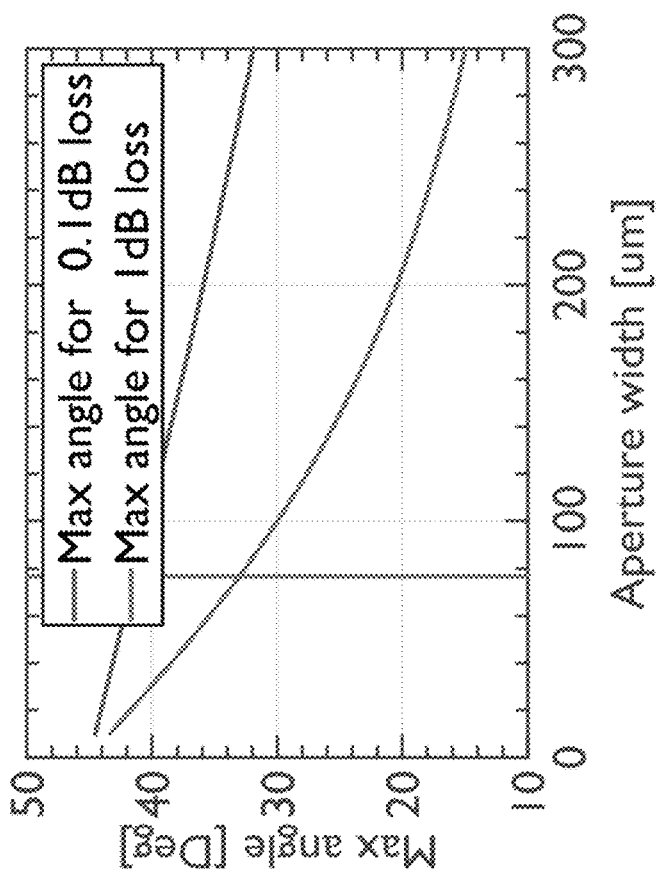
FIGS. 19A and 19B are plots of maximum angle as a function of aperture width and power as a function of angle, respectively.
Figure 19B:
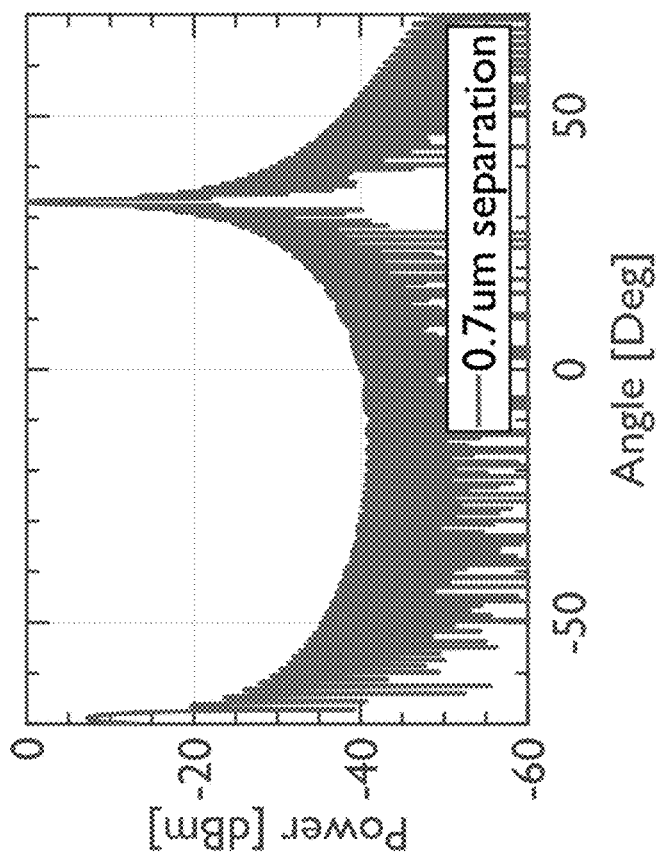

As can be seen in FIG. 19A, the tolerated loss for a specific design limits the maximum slab propagation region length. For example, tolerating a 1 dB loss leads to a steering range of about 33 degrees in some embodiments. If the allowable loss is only 0.1 dB, the maximum length is much smaller than when 1 dB loss is permitted. As can be seen in FIG. 19B, larger aperture sizes (and a larger number of phase control elements and emitting elements) allows for longer low-loss propagation lengths but increases the total optical switching network width. As the allowable length scales quadratically and the total width increases linearly, the total required steering without sidelobes improves as the aperture phase control and emitting element count is increased. As making very large apertures may pose fabrication and phase-shifter control challenges, the size of the aperture cannot necessarily scale indefinitely, and a certain side-lobe free steering may be required. For example, if each emitting element within an emitting aperture is placed 700 nm away from the next, the 128-element aperture is smaller than 100 µm in width and needs to steer to more than 30 degrees. Such an aperture based on 700 nm placement of the elements can steer to 35 degrees without significant loss to the grating sidelobes and choosing a tighter element factor that is limited to 35 degrees can improve the sidelobe suppression further.

Figure 20A:
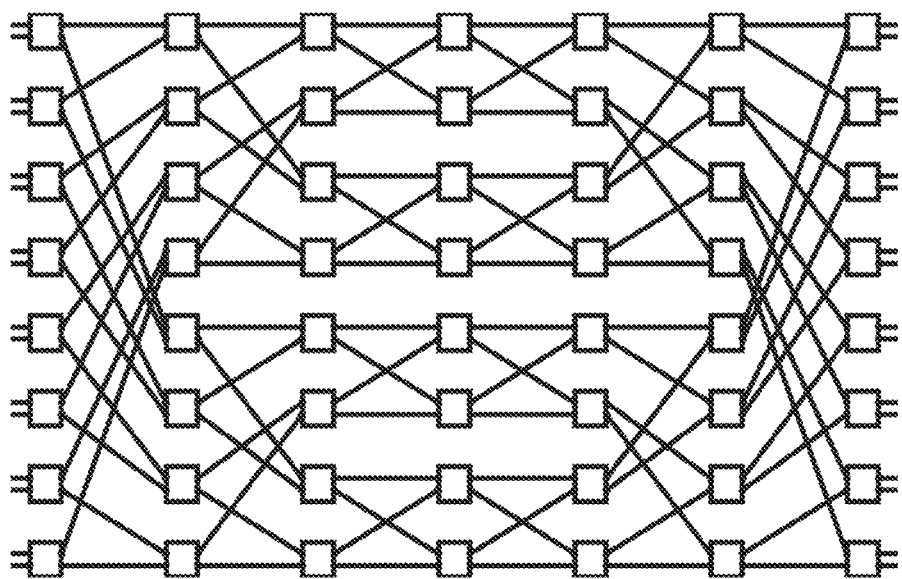
FIG. 20A is a schematic diagram of an example 16×16 optical switching network formed with 2×2 individual switches.

As mentioned above, the total number of apertures in one switch is limited by the steering angle. If the design calls for a larger number of input/output ports, the optical switching networks with optical phased arrays can be used as individual switching elements (or "switches") that are combined in a larger multi-stage optical switching network to provide a larger I/O count. FIG. 20A shows an example of 16×16 optical switching network formed with integrated optical waveguides connecting individual 2×2 switches. In such configurations, a 2×2 MZI type switch can be used as the basic building block of the system and the number of waveguide crossing used in such system grows exponentially. A network with the topology shown in this example is typically called a Benes network.

If the number of required input and outputs is increased, the number of crossings is increased significantly which leads to relatively high losses and crosstalk. Therefore, to form networks with a larger number of input and output ports it is useful to increase the number of ports each building block of the system accepts.

Figure 20B:
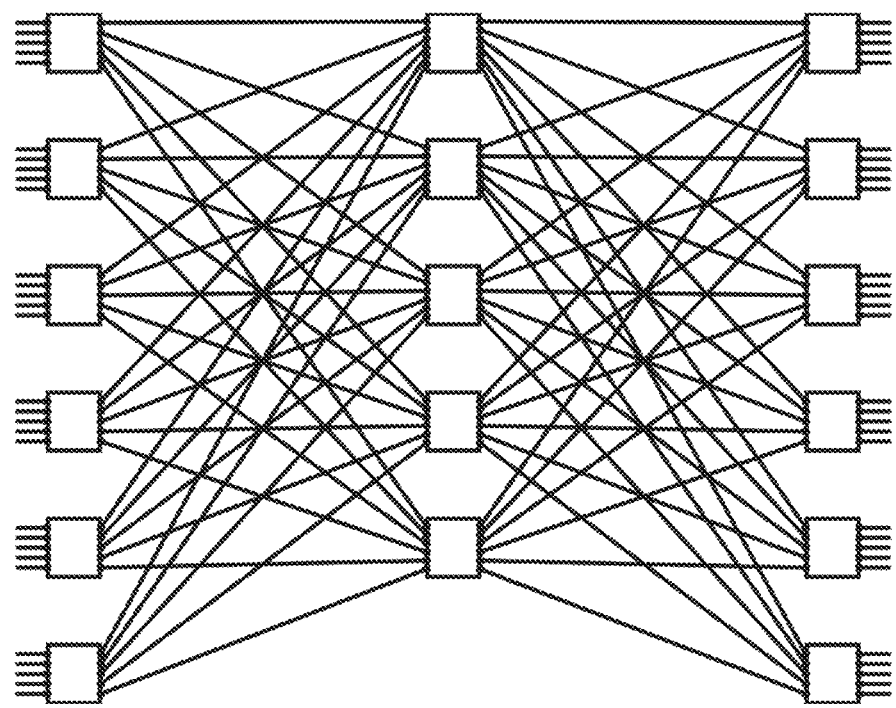
FIG. 20B is a schematic diagram of an example Clos network.

FIG. 20B shows a 30×30 Clos network arrangement with an increased number of input/outputs at each switch. The Clos network accepts four I/Os at each of its switching elements, and the number of stages (or "layers") used is reduced compared with an alternative Benes network (e.g., formed using 2×2 switches).

Figures 21A, 21B:
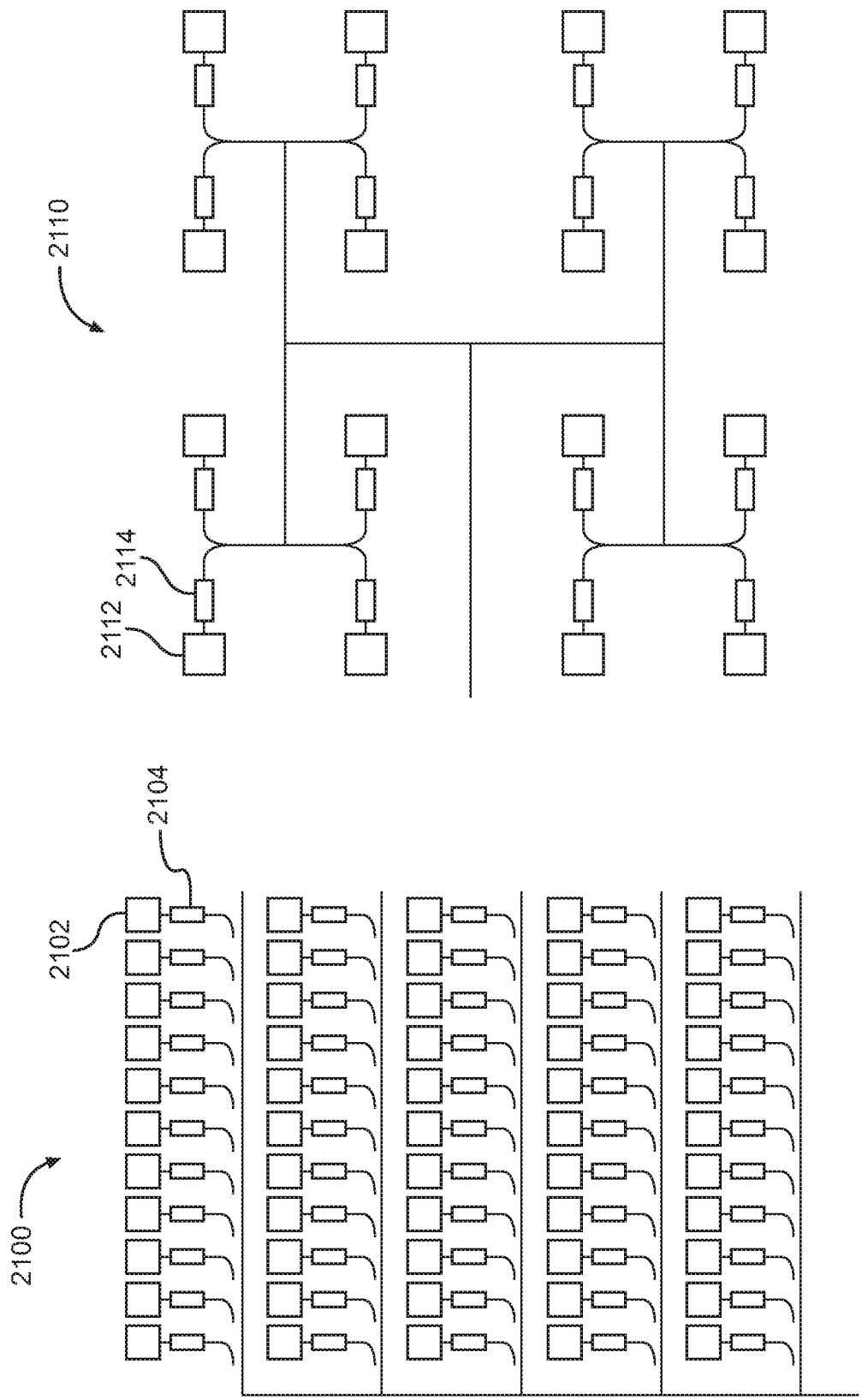

An optical phased array 200 as shown in FIG. 2, can steer the beam in a single dimension (i.e., the sideways direction) using just the phases of the phase shifters 204. To be able to steer the beam in both directions of a 2-dimensional (2D) receiving plane, any of a variety of different optical phased array configurations with phase control may be used such as the configurations shown in FIGS. 21A and 21B. In FIG. 21A, a 2D array 2100 includes rows of emitters 2102 that are controlled by phase shifters 2104. In FIG. 21B, a 2D array 2110 includes a network of emitters 2112 that are controlled by phase shifters 2114.

Figure 22:
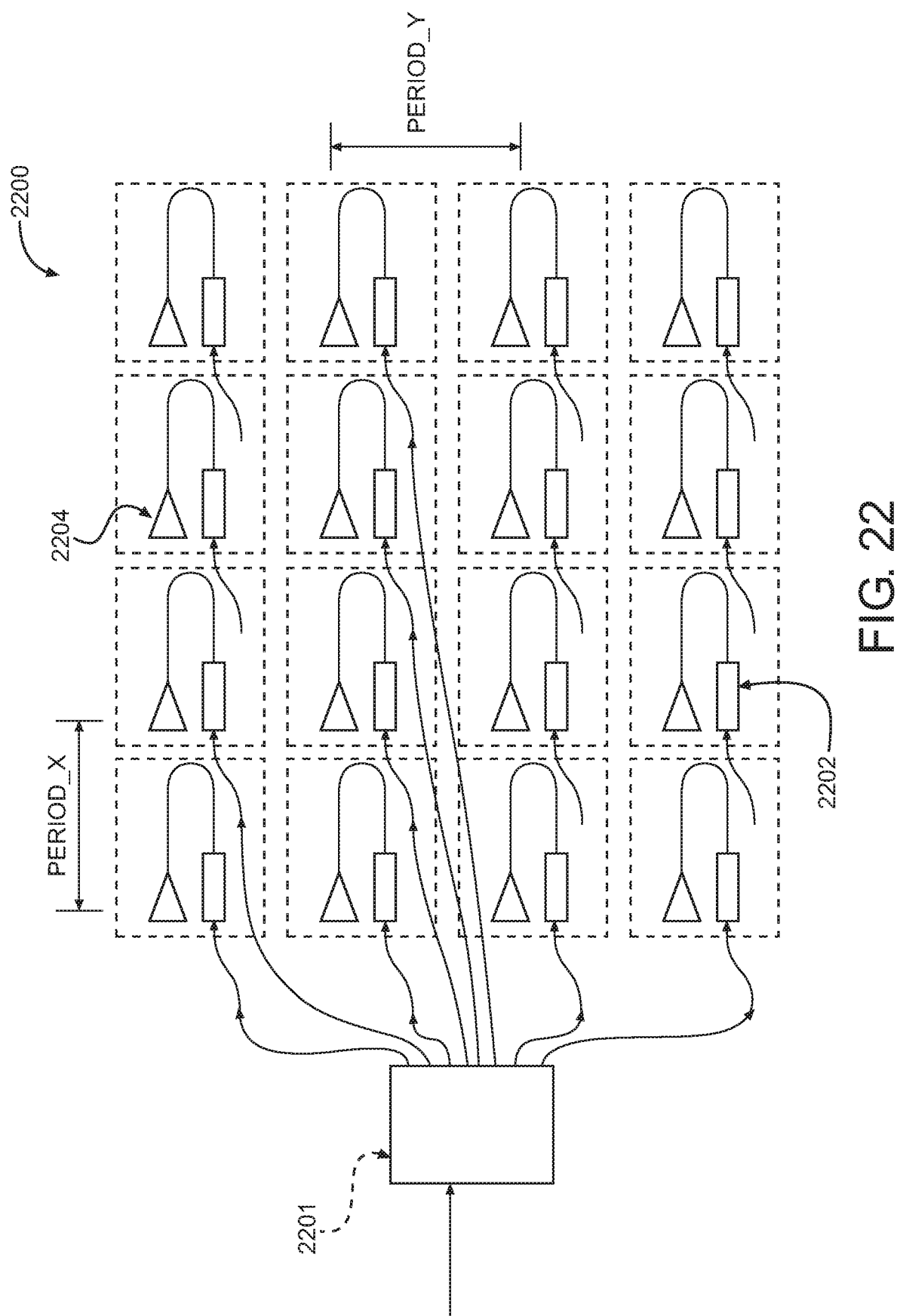
FIG. 22 is a schematic diagram of a 2D optical phased array.

Using 2D optical phased arrays, as shown in FIG. 21A or 21B, the optical beams can be steered between the individual 2D optical phased arrays. As long as the 2D optical phased array can steer over a certain range without grating sidelobes showing up in the emission pattern, both the send and receive phased array antenna gain functions can be directed toward the desired direction and selectively send the data towards the desired path, as shown in FIG. 22. Typically, the placement of emitters in the 2D optical phased array are not as tight as the phase shifters, since emitters in two directions, and splitters and routers, occupy space.

Figure 23:
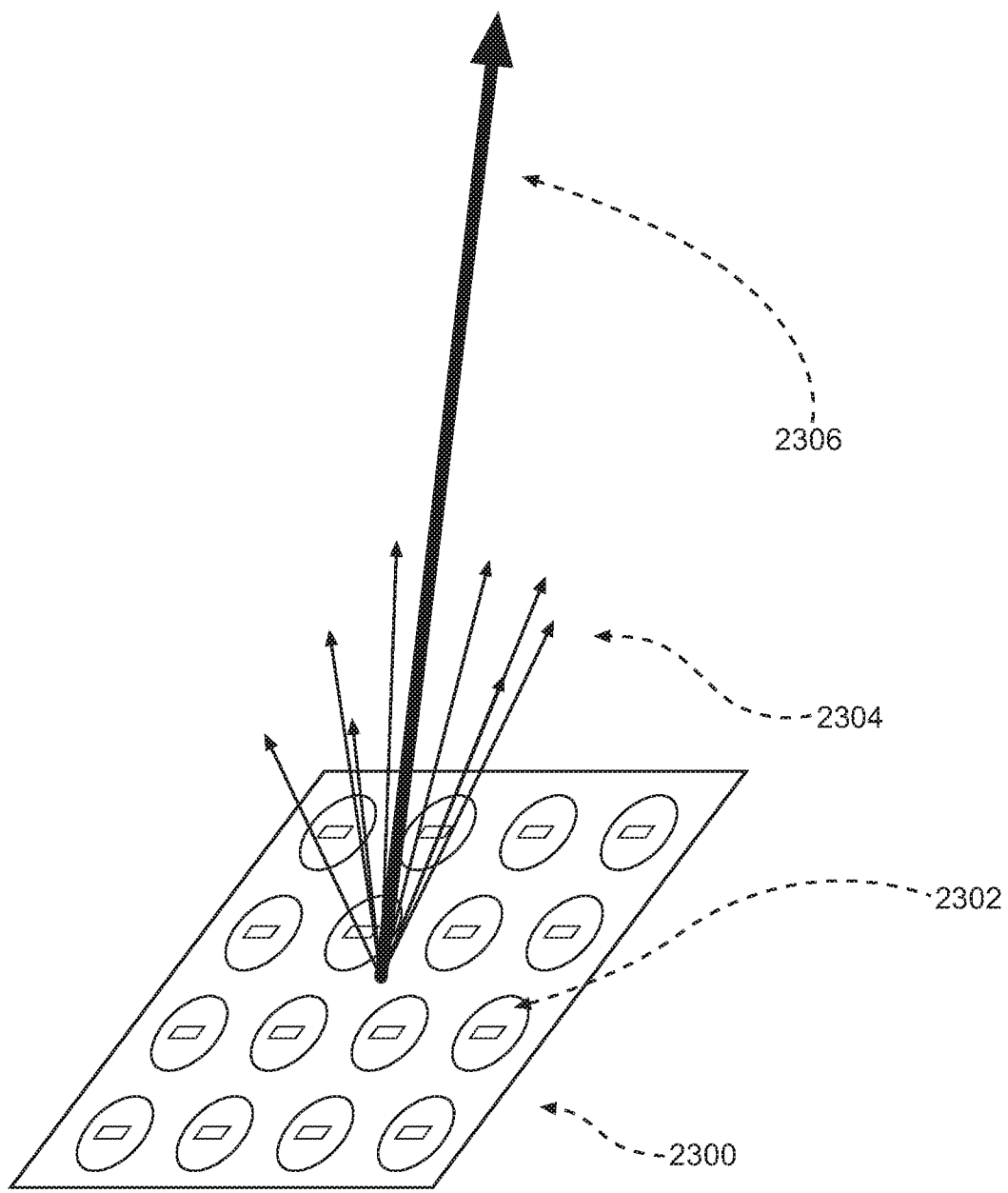
FIG. 23 is a schematic diagram of a 2D optical phased array with microlenses.

A potential advantage, in some implementations, of the tree-shaped power distribution of the 1D optical phased array, as shown in FIG. 2, over a 2D optical phased array, as shown in FIG. 22, is that the placement of emitters in a 1D array similar to the optical phased array 200 allows the emitters to be tightly packed and eliminate the presence of sidelobes, or at least minimize the emission of power into the sidelobes. But, in some implementations, the emitters in the 2D optical phased array 2200 can be placed at a small enough array period in both dimensions (e.g., PERIOD_X and/or PERIOD_Y) such that sidelobes can be eliminated or reduced (e.g., period shorter than half of the smallest wavelength in use). The values of PERIOD_X and PERIOD_Y can be selected to be similar to each other, for a relatively uniform spatial arrangement, but do not necessarily need to be exactly the same (e.g., a difference of less than around 20%). Alternatively, whether the array period is not small enough to eliminate or reduce sidelobes entirely, sidelobes can be eliminated or reduced by placement of microlenses 2302 on each emitter of a 2D optical phased array 2300, as shown in FIG. 23, which makes the element factor more directional. Intensity of side beams 2304 corresponding to sidelobes in a 2D radiation pattern can be reduced in magnitude relative to an intensity of a main beam 2306, as represented by the sizes of the arrows in FIG. 23. This use of a microlens array, as a trade-off to making the element factor more directional, may reduce the optical phased array steering range and thus may call for the transmit/receive 2D optical phased arrays (shown in FIG. 24) to be placed at a long enough distance apart from each other.

Referring again to FIG. 22, the 2D optical phased array (2D-OPA) 2200 includes an optical distribution network 2201 used as an optical power distributor to evenly split optical power among waveguides that distribute optical waves to each of the phase shifters 2202 feeding the emitters 2204. In some implementations, the differences in the optical path lengths of the different waveguides between the optical distribution network 2201 and each phase shifter 2202 are designed to be small enough so that any time delay differences are short compared to any signal operating bandwidth or spectral range and/or timing constraints (e.g., small time delay relative to a time slot of a given size, such as 10 ps). In some implementations, phases imposed by the phase shifters 2202 can also be adjusted to compensate for optical path length differences.

Figure 24:
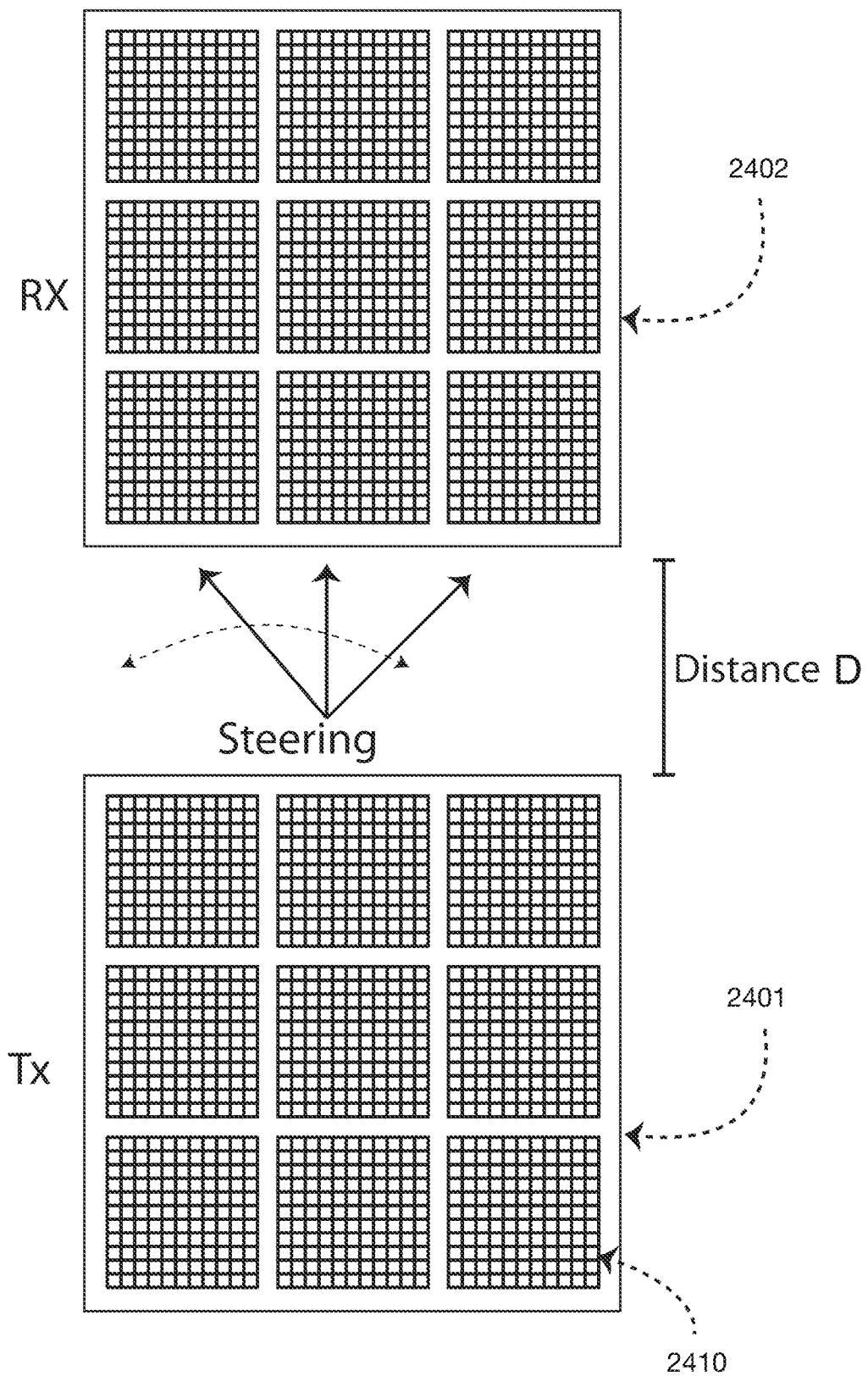
FIG. 24 is a schematic diagram of a 2D optical switching network.
Figure 25:
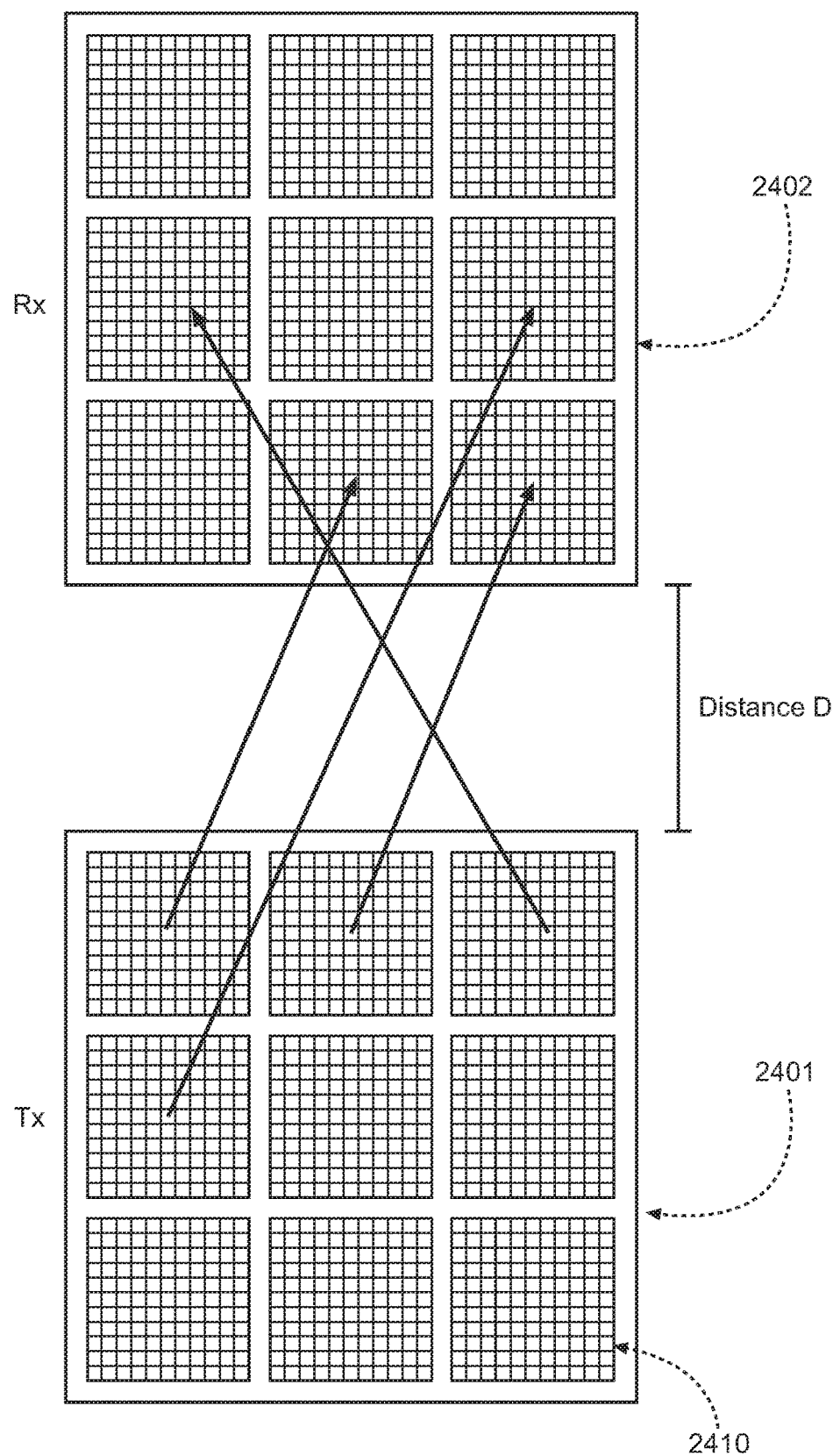
FIG. 25 is a schematic diagram of a 2D optical switching network.
Figure 26:
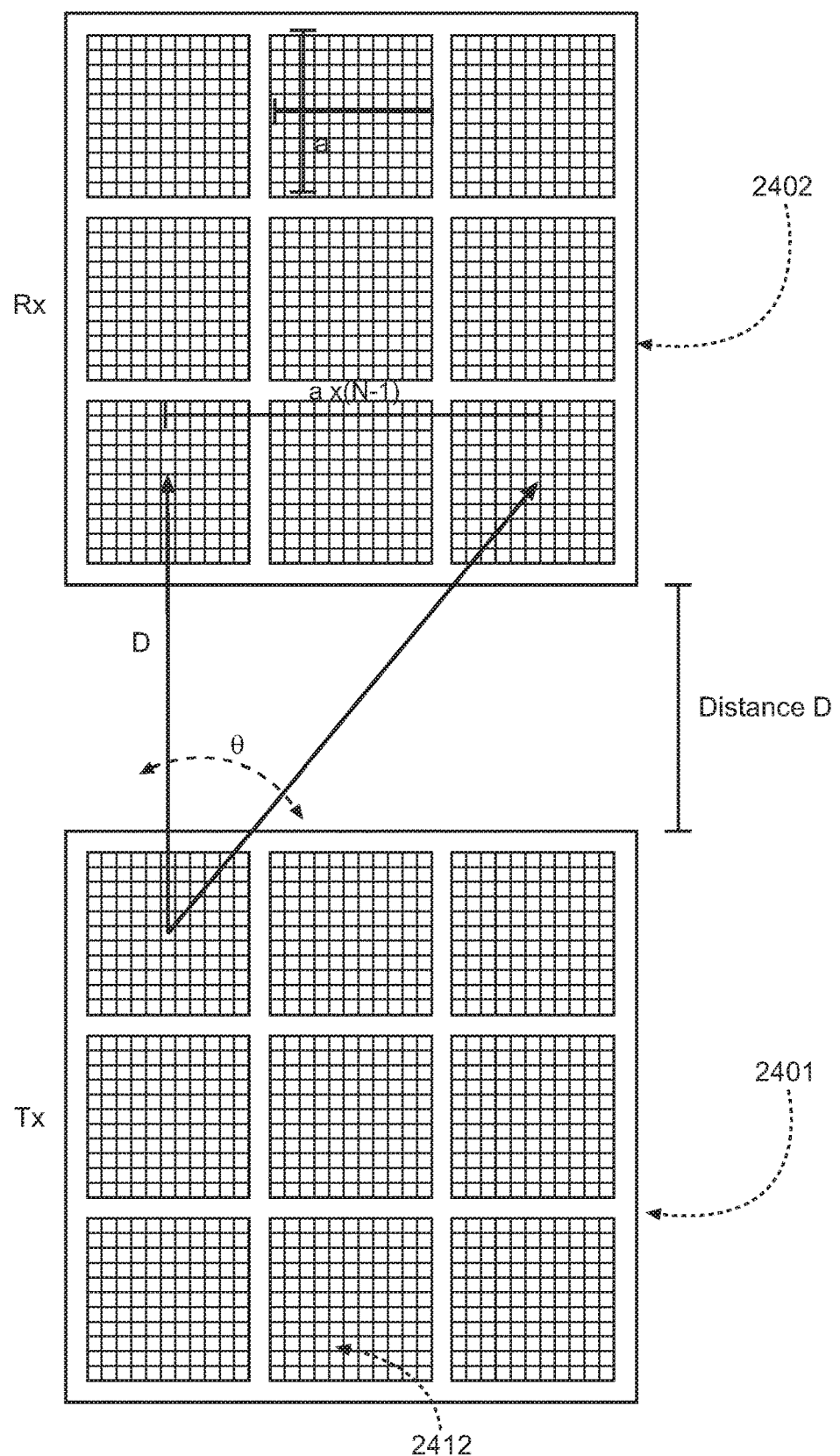
FIG. 26 is a schematic diagram of a 2D optical switching network.

Referring to FIG. 24, an optical switching network includes a transmitting (Tx) arrangement 2401 of 2D-OPAs used to send beams to a receiving (Rx) arrangement 2402 of 2D-OPAs. A particular 2D-OPA within the transmitting arrangement 2401, such as 2D-OPA 2410, is able to steer a beam towards any one of the 2D-OPAs within the receiving arrangement 2402. The distance D between the arrangements can be set by structure that holds the arrangements at fixed locations leaving free space (e.g., air) between the arrangements, or by an optically transmissive material that fills the space between the arrangements. Similar trade-offs apply as in the case of arrangements of 1D optical phased arrays. For example, a larger distance D allows the maximum steering range needed to be smaller, but also allows the (two-dimensional, i.e., unconfined in both dimensions) gaussian beam profile to spread more, potentially leading to larger losses. The larger the maximum steering range, the larger the number of 2D-OPAs that will be able to fit within the arrangement. While the example in FIG. 24 does not show a perspective view, the two arrangements include rows and columns of flat 2D-OPAs over flat surfaces that are parallel to each other. Alternatively, in some implementations, flat 2D-OPAs can be arranged over concave surfaces that are approximately spherical, such that a cross-section would appear similar to the optical switching network 300. In some implementations, instead of flat 2D-OPAs, the emitters of an individual 2D-OPA can be arranged over a concave surface as well. In FIG. 25, the same optical switching network is shown with examples of different 2D-OPAs in the transmitting arrangement 2401 sending beams to different 2D-OPAs in the receiving arrangement 2402. FIG. 26 shows the same optical switching arrangement with an example of the geometry of the steering range for a given 2D-OPA transmitting among given a row of receiving 2D-OPAs being related to the distance D and the length between the centers of the 2D-OPAs on either end of the row given here as the size "a" (the side of a square shaped 2D-OPA) of a given 2D-OPA multiplied by N−1 where N (3 in this example) is the number of 2D-OPAs in a row. The computations and trade-offs are similar to those above described for the 1D-OPAs.

Figure 27:
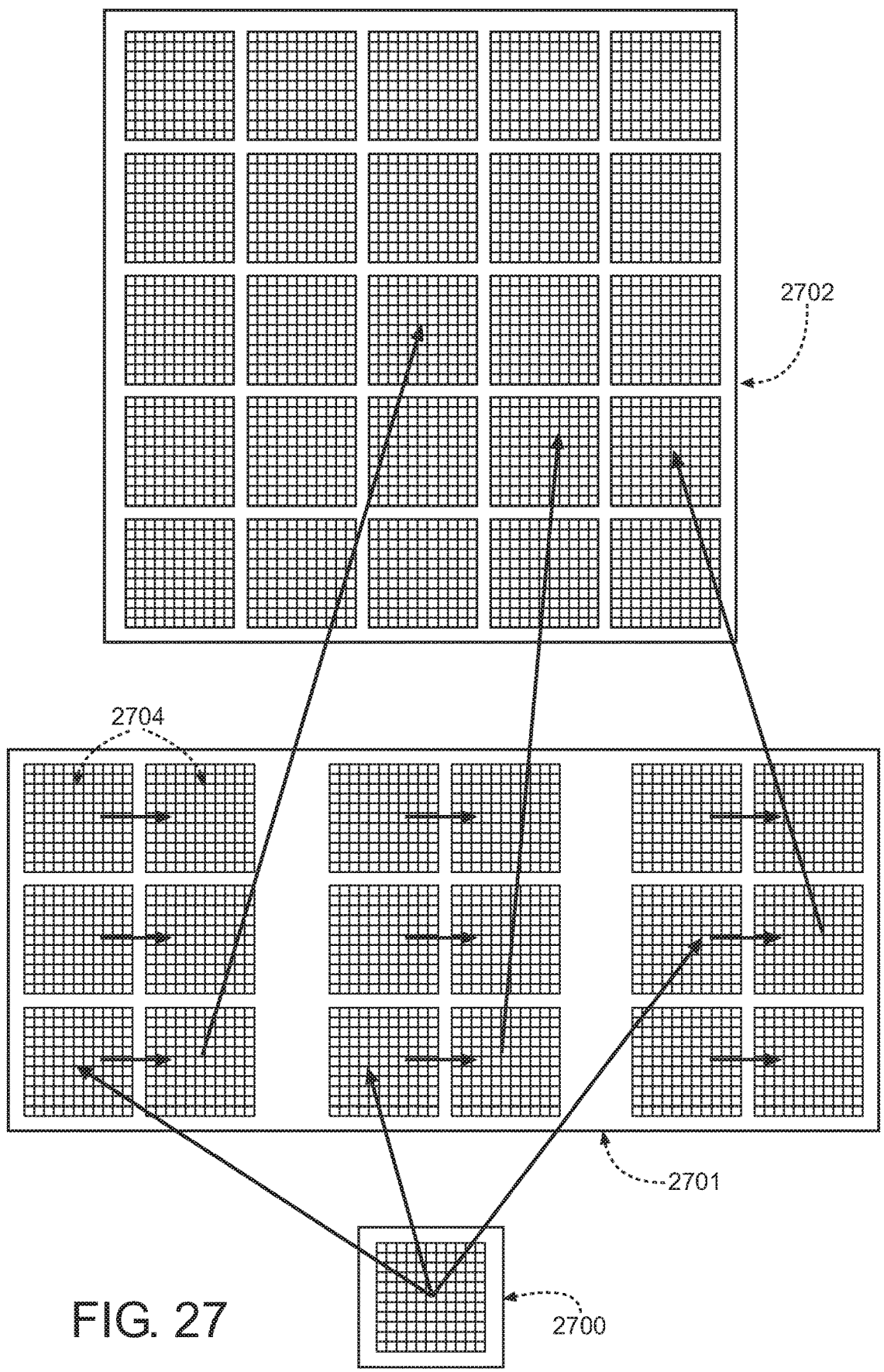
FIG. 27 is a schematic diagram of a 2D optical switching network with an intermediate arrangement of optical phased arrays.

Referring to FIG. 27, a 2D-OPA 2700, which could be part of an arrangement of multiple 2D-OPAs (not shown) is able to transmit a beam to an intermediate arrangement 2701 of pairs of 2D-OPAs arranged over a plane, which relay the beams to a receiving arrangement 2702 of 2D-OPAs. A given pair 2704 of 2D-OPAs includes one 2D-OPA configured to receive a beam and another 2D-OPA configured to transmit a beam. A waveguide connects the 2D-OPAs of the pair 2704 by connecting to a port of an optical power combiner of the receiving 2D-OPA and an optical power distributor of a transmitting 2D-OPA. In this way, arrangements of 2D-OPAs can be cascaded with any number of stages using any number of intermediate arrangements. This enables the total distance over which the switching takes place to be increased. While this example shows the pair of 2D-OPAs arranged adjacent to each other, in other examples the pair can be separated, with a longer waveguide connecting them, enabling other arrangements, such as a cluster of receiving 2D-OPAs and separate cluster of transmitting 2D-OPAs. In a similar manner, 1D optical switching networks can include multiple stages using intermediate arrangements of 1D-OPAs.

Figure 28:
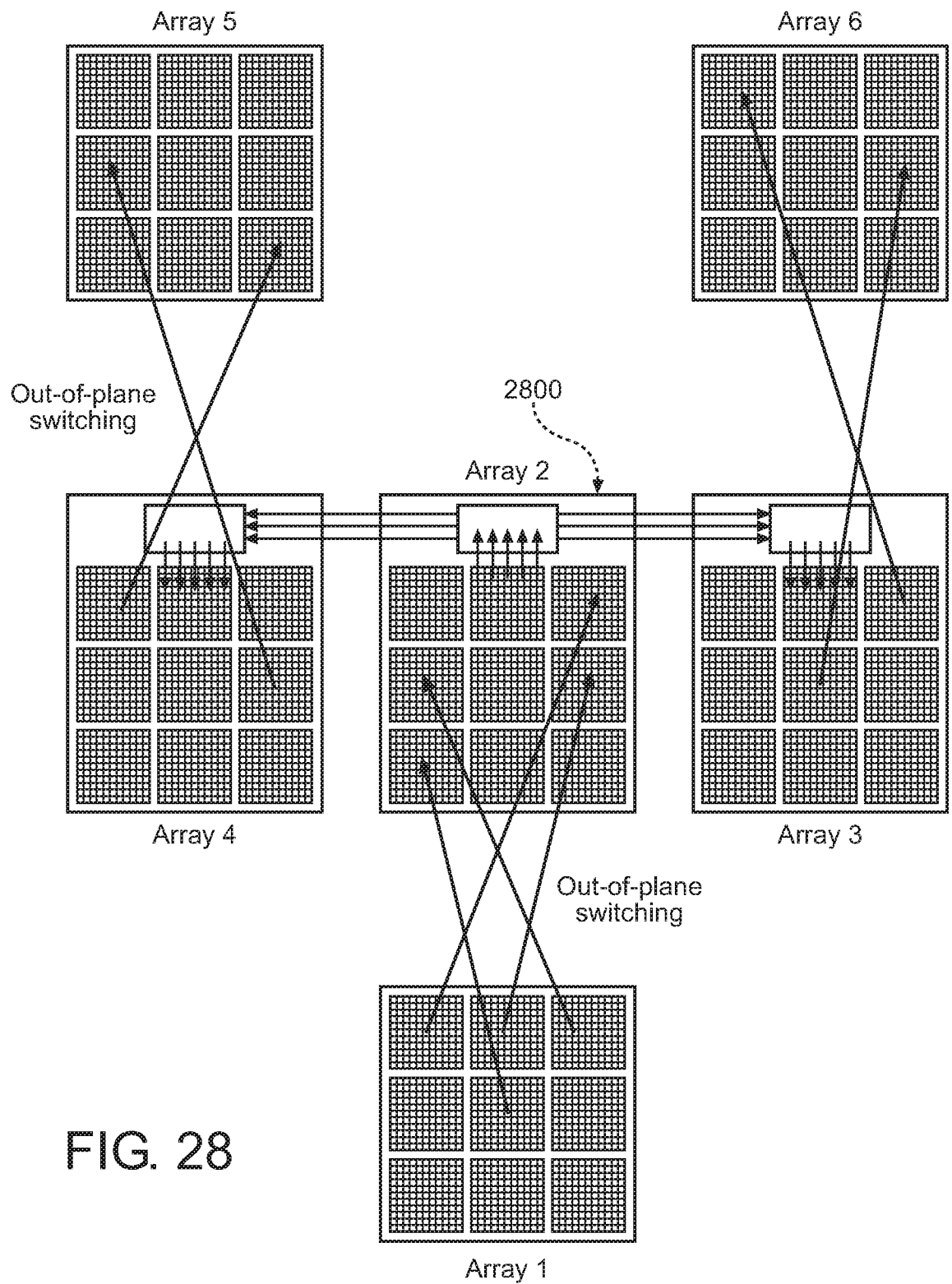
FIG. 28 is a schematic diagram of a 2D optical switching network with an intermediate arrangement of optical phased arrays.

A variety of other arrangements are possible, including arrangements in which there are in-plane switches that enable a single receiving 2D-OPA to send an optical wave to any of a variety of transmitting 2D-OPAs, depending on the state of the in-plane switch. For example, the in-plane switch can be a 1D optical switching network based on a set of 1D-OPAs, as described herein. FIG. 28 shows an example of multiple 3×3 arrays of 2D-OPAs for sending beams from an Array 1 to either Array 5 or Array 6 via a set of intermediate arrays, Array 2, Array 3, and Array 4. Out-of-plane switching is used to transmit beams from 2D-OPAs of Array 1 to 2D-OPAs of Array 2. An in-plate switch 2800 is then used to switch the optical waves within a plane of an arrangement containing Array 2, Array 3, and Array 4. Then Array 4 is able to transmit to Array 5 using out-of-plane switching, and Array 3 is able to transmit to Array 6 using out-of-plane switching.

The various optical switching networks described herein can be operated as dynamically configurable cross-connect switches in a variety of operating modes. For example, a data center can use optical switching devices that include these optical switching networks to cross-connect unidirectionally among a set of input optical fibers to a set of output optical fibers connected to different OPAs (1D-OPAs or 2D-OPAs). Alternatively, some devices can operate in a bidirectional manner with optical waves being sent in either direction between one set of optical fibers and another set of optical fibers. In such a bidirectional configuration each optical fiber can be coupled to a port of the optical switching network using an optical circulator, which allows optical waves to be coupled in and out of a given port at the same time. In this way bidirectional ports can serve as both input ports and output ports simultaneously. For example, one port of a circulator can receive an optical wave from a laser, a second port of the circulator can provide an optical wave to a photodetector, and a third port of the circulator can be coupled to a bidirectional port of the optical switching network, with an optical wave from the laser circulating to the bidirectional port and an optical wave received from the bidirectional port circulating to the photodetector. Another way to allow for bidirectional switching is to dedicate a first subset of OPAs for use in one direction, and another non-overlapping subset of OPAs for use in the other direction, without the need for using circulators at the ports.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An optical switching apparatus comprising:
    a plurality of input ports receiving respective input optical waves, each input port coupled to a respective beam-forming structure that emits a beam emitted over a respective spatial region at a selected transmission angle, and each beam-forming structure comprising:
        an optical waveguide into which a respective input optical wave is received,
        an optical power distributor configured to distribute optical power from a mode of the optical waveguide into a plurality of coupling structures arranged over the respective spatial region, and
        a spatially distributed phase shifter configured to apply different transmission optical phase shifts over different individual phase shifters each coupled to a different one of the coupling structures arranged over the respective spatial region, where the transmission optical phase shifts determine the selected transmission angle;
    a plurality of output ports providing respective output optical waves, each output port coupled to a respective beam-receiving structure that collects light from a beam received at a selected reception angle over a respective spatial region, and each beam-receiving structure comprising:
        a spatially distributed phase shifter configured to apply different reception optical phase shifts over different individual phase shifters each coupled to a different coupling structure of a plurality of coupling structures arranged over the respective spatial region, where the reception optical phase shifts determine the selected reception angle,
        an optical power combiner configured to combine optical power from the plurality of coupling structures arranged over the respective spatial region into a collected mode, and
        an optical waveguide coupling the collected mode into a respective output optical wave; and
    an optically transmissive portion separating the coupling structures of the beam-forming structures and the coupling structures of the beam-receiving structures by a distance that is shorter than a Rayleigh range associated with the beam emitted by the beam-forming structure.

2. The optical switching apparatus of claim 1, wherein a first optical power distributor of a first beam-forming structure comprises a first network of waveguide splitters.

3. The optical switching apparatus of claim 2, wherein a first optical power combiner of a first beam-receiving structure comprises a second network of waveguide splitters, different from the first network of waveguide splitters.

4. The optical switching apparatus of claim 3, wherein the first network of waveguide splitters and the second network of waveguide splitters are composed of structures that are identical copies of each other.

5. The optical switching apparatus of claim 3, wherein the first network of waveguide splitters and the second network of waveguide splitters each include one or more 1×2 splitters.

6. The optical switching apparatus of claim 3, wherein a first spatially distributed phase shifter of the first beam-forming structure comprises a plurality of the individual phase shifters distributed over the respective spatial region associated with the first beam-forming structure.

7. The optical switching apparatus of claim 6, wherein the first network of waveguide splitters distributes optical power of an incoming optical wave at an input of the first network of waveguide splitters substantially equally to each of the individual phase shifters.

8. The optical switching apparatus of claim 6, wherein each of the individual phase shifters is coupled to a respective coupling structure configured to emit optical waves.

9. The optical switching apparatus of claim 8, wherein a second spatially distributed phase shifter of the first beam-receiving structure comprises a plurality of the individual phase shifters distributed over the respective spatial region associated with the first beam-receiving structure.

10. The optical switching apparatus of claim 9, wherein each of the individual phase shifters is coupled to a respective coupling structure configured to receive optical waves.

11. The optical switching apparatus of claim 10, wherein the optically transmissive portion comprises an optically transmissive slab.

12. The optical switching apparatus of claim 11, wherein the coupling structures of the first beam-forming structure are distributed adjacent to each other over an aperture at a first edge of the optically transmissive slab, and the coupling structures of the first beam-receiving structure are distributed adjacent to each other over an aperture at a second edge of the optically transmissive slab.

13. The optical switching apparatus of claim 12, wherein a shape of the first edge is approximately a curved arc, and a shape of the second edge is approximately a curved arc.

14. The optical switching apparatus of claim 1, wherein a plurality of identical copies of the optical switching apparatus are included as switching elements within a Clos network arrangement.

15. The optical switching apparatus of claim 1, wherein each spatial region comprises a one-dimensional array of a plurality of the coupling structures.

16. The optical switching apparatus of claim 1, wherein each spatial region comprises a two-dimensional array of a plurality of the coupling structures.

17. The optical switching apparatus of claim 16, wherein at least a first two-dimensional array comprises a two-dimensional arrangement of emitting or receiving elements spaced at a period X in a first dimension and spaced at a period Y in a second dimension.

18. The optical switching apparatus of claim 17, wherein the period X and the period Y are both smaller than half of a smallest wavelength of the input optical waves.

19. The optical switching apparatus of claim 17, wherein the first two-dimensional array further comprises a two-dimensional arrangement of lenses spaced at the period X in the first dimension and spaced at the period Y in the second dimension.

20. The optical switching apparatus of claim 1, wherein each coupling structure of the plurality of coupling structures arranged over the respective spatial region of each beam-forming structure, and the plurality of coupling structures arranged over the respective spatial region of each beam-receiving structure, comprises a grating or a metallic antenna.

21. The optical switching apparatus of claim 1, wherein the optically transmissive portion comprises an optically transmissive slab.

22. The optical switching apparatus of claim 21, wherein the optically transmissive slab comprises a dielectric film.

23. A method of optically switching optical waves received at a plurality of input ports to selected ones of a plurality of output ports, the method comprising:
receiving at a plurality of input ports respective input optical waves;
emitting a beam from a first optical phased array, coupled to a corresponding one of the input ports, at a selected transmission angle using phase shifts applied to different emitting elements of the first optical phased array;
receiving the beam at a second optical phased array, coupled to a corresponding output port, at a selected reception angle using phase shifts applied to different receiving elements of the second optical phased array, with an optically transmissive portion separating the first optical phased array and the second optical phased array by a distance that is shorter than a Rayleigh range associated with the beam; and
providing from a plurality of output ports respective output optical waves corresponding to respective input optical waves, including an output optical wave corresponding to the beam received at the second optical phased array.

24. The method of claim 23, wherein each emitting element of the first optical phased array, and each receiving element of the second optical phased array, comprises a grating or a metallic antenna.

25. A method of fabricating an optical switching apparatus, the method comprising:
fabricating a set of beam-forming structures coupled to a plurality of input ports receiving respective input optical waves, each input port coupled to a respective beam-forming structure that emits a beam emitted over a respective spatial region at a selected transmission angle, and each beam-forming structure comprising:
an optical waveguide into which a respective input optical wave is received,
an optical power distributor configured to distribute optical power from a mode of the optical waveguide into a plurality of coupling structures arranged over the respective spatial region, and
a spatially distributed phase shifter configured to apply different transmission optical phase shifts over different individual phase shifters each coupled to a different one of the coupling structures arranged over the respective spatial region, where the transmission optical phase shifts determine the selected transmission angle;
fabricating a set of beam-receiving structures coupled to a plurality of output ports providing respective output optical waves, each output port coupled to a respective beam-receiving structure that collects light from a beam received at a selected reception angle over a respective spatial region, and each beam-receiving structure comprising:
a spatially distributed phase shifter configured to apply different reception optical phase shifts over different individual phase shifters each coupled to a different coupling structure of a plurality of coupling structures arranged over the respective spatial region, where the reception optical phase shifts determine the selected reception angle,
an optical power combiner configured to combine optical power from the plurality of coupling structures arranged over the respective spatial region into a collected mode, and
an optical waveguide coupling the collected mode into a respective output optical wave; and
fabricating an optically transmissive portion separating the coupling structures of the beam-forming structures and the coupling structures of the beam-receiving structures by a distance that is shorter than a Rayleigh range associated with the beam emitted by the beam-forming structure.

26. An optical switching apparatus comprising:
a plurality of input ports receiving respective input optical waves, each input port coupled to a respective optical phased array (OPA), of a first set of OPAs, that emits a beam emitted over a respective spatial region at a selected transmission angle;

a plurality of output ports providing respective output optical waves, each output port coupled to a respective OPA, of a second set of OPAs, that collects light from a beam received at a selected reception angle over a respective spatial region;

a third set of OPAs between the first set of OPAs and the second set of OPAs, the third set OPAs including at least one OPA configured to receive a beam at a first angle from an OPA in the first set of OPAs and at least one OPA configured to transmit a beam at a second angle different from the first angle to an OPA in the second set of OPAs;

a first optically transmissive portion separating the first set of OPAs and the third set of OPAs by a distance that is shorter than a Rayleigh range associated with the beam emitted by the first set of OPAs; and a second optically transmissive portion separating the second set of OPAs and the third set of OPAs by a distance that is shorter than a Rayleigh range associated with the beam transmitted by the third set of OPAs.

27. The optical switching apparatus of claim 26, wherein each OPA of the first set of OPAs comprises:

an optical waveguide into which a respective input optical wave is received, an optical power distributor configured to distribute optical power from a mode of the optical waveguide over the respective spatial region, and a spatially distributed phase shifter configured to apply different transmission optical phase shifts over different portions of the respective spatial region, where the transmission optical phase shifts determine the selected transmission angle.

28. The optical switching apparatus of claim 27, wherein each OPA of the second set of OPAs comprises:

a spatially distributed phase shifter configured to apply different reception optical phase shifts over different portions of the respective spatial region, where the reception optical phase shifts determine the selected reception angle, an optical power combiner configured to combine optical power from different portions of the respective spatial region into a collected mode, and an optical waveguide coupling the collected mode into a respective output optical wave.

29. The optical switching apparatus of claim 26, wherein the third set of OPAs comprises an arrangement of pairs of OPAs, each pair of OPAs including a first OPA configured to receive a beam at a first angle from an OPA in the first set of OPAs, and a second OPA configured to transmit a beam at a second angle different from the first angle to an OPA in the second set of OPAs.

30. The optical switching apparatus of claim 26, wherein the third set of OPAs comprises an arrangement of OPAs interconnected by a switch, including a first OPA configured to receive a beam at a first angle from an OPA in the first set of OPAs, and a second OPA connected to the first OPA over the switch and configured to transmit a beam at a second angle different from the first angle to an OPA in the second set of OPAs.

* * * * *